(12) United States Patent
Raghavan et al.

(10) Patent No.: US 12,101,147 B2
(45) Date of Patent: Sep. 24, 2024

(54) HETEROGENOUS BEAMFORMING CAPABILITY WITH MIXED BEAMFORMING ARCHITECTURE

(71) Applicant: QUALCOMM Incorporated, San Diego, CA (US)

(72) Inventors: Vasanthan Raghavan, West Windsor Township, NJ (US); Tao Luo, San Diego, CA (US); Mohammad Ali Tassoudji, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 145 days.

(21) Appl. No.: 17/527,022

(22) Filed: Nov. 15, 2021

(65) Prior Publication Data

US 2023/0155650 A1    May 18, 2023

(51) Int. Cl.
*H04B 7/06* (2006.01)
*H04B 7/0413* (2017.01)

(52) U.S. Cl.
CPC ......... *H04B 7/0617* (2013.01); *H04B 7/0413* (2013.01)

(58) Field of Classification Search
CPC .......................... H04B 7/0617; H04B 7/0413
See application file for complete search history.

(56) References Cited

U.S. PATENT DOCUMENTS

| | | | |
|---|---|---|---|
| 9,094,023 B2 * | 7/2015 | Shin | H03L 7/18 |
| 10,069,555 B2 * | 9/2018 | Islam | H04W 72/23 |
| 10,181,891 B2 * | 1/2019 | Islam | H04B 7/0695 |
| 10,425,138 B2 * | 9/2019 | Islam | H04B 7/0417 |
| 10,461,821 B1 * | 10/2019 | Nammi | H04B 7/0634 |
| 10,492,208 B2 * | 11/2019 | Petersson | H04W 72/12 |

(Continued)

FOREIGN PATENT DOCUMENTS

| | | | | |
|---|---|---|---|---|
| AU | 2017249058 A1 * | 9/2018 | ........... | H04B 7/0408 |
| AU | 2017249059 A1 * | 9/2018 | ........... | H04B 7/0417 |

(Continued)

OTHER PUBLICATIONS

H. Yin, Z. Jiang, X.-W. Zhu and C. Yu, "Over-the-air Behavioral Modeling of Millimeter Wave Beamforming Transmitters with Concurrent Dynamic Configurations Utilizing Heterogenous Neural Network," 2020 IEEE, pp. 397-400. (Year: 2020).*

*Primary Examiner* — Berhanu Tadese
(74) *Attorney, Agent, or Firm* — Holland & Hart LLP

(57) ABSTRACT

Methods, systems, and devices for wireless communications are described. A user equipment (UE) may transmit control signaling indicating a set of beamforming configurations associated with a set of antenna panels at the UE. The UE may select one or more antenna elements of at least one antenna panel of the set of antenna panels based on a beamforming configuration associated with the at least one antenna panel. The UE may generate a set of beam weights for a wireless communication based on the beamforming configuration and the one or more antenna elements, and may use the generated set of beam weights to transmit the wireless communication. In some examples, the UE may include, in the control signaling, indications of a set of beamforming properties, a number of beam weights, a resource differential, or a combination thereof, associated with each beamforming configuration.

27 Claims, 16 Drawing Sheets

(56) References Cited

U.S. PATENT DOCUMENTS

| | | | | |
|---|---|---|---|---|
| 10,498,406 | B2 * | 12/2019 | Islam | H04W 40/08 |
| 10,505,615 | B2 * | 12/2019 | Islam | H04B 7/0621 |
| 10,541,741 | B2 * | 1/2020 | Islam | H04B 7/0695 |
| 10,575,307 | B2 * | 2/2020 | Nagaraja | H04W 36/0072 |
| 10,651,899 | B2 * | 5/2020 | Islam | H04W 16/28 |
| 10,673,502 | B2 * | 6/2020 | Lee | H04W 88/085 |
| 10,715,241 | B2 * | 7/2020 | Islam | H04B 7/0617 |
| 10,826,578 | B2 * | 11/2020 | Nammi | H04B 7/0456 |
| 10,917,158 | B2 * | 2/2021 | Islam | H04W 74/0858 |
| 10,985,828 | B2 * | 4/2021 | Islam | H04W 28/0231 |
| 11,075,682 | B2 * | 7/2021 | Islam | H04B 7/088 |
| 11,088,747 | B2 * | 8/2021 | Islam | H04L 5/0051 |
| 11,095,358 | B2 * | 8/2021 | Islam | H04W 74/0858 |
| 11,101,850 | B2 * | 8/2021 | Cao | H04B 7/06966 |
| 11,101,869 | B2 * | 8/2021 | Islam | H04B 7/061 |
| 11,108,441 | B2 * | 8/2021 | Islam | H04W 40/08 |
| 11,228,354 | B2 * | 1/2022 | Lee | H04L 69/04 |
| 11,251,849 | B2 * | 2/2022 | Park | H04B 7/0456 |
| 11,309,941 | B2 * | 4/2022 | Islam | H04B 7/088 |
| 11,310,674 | B2 * | 4/2022 | Reial | H04W 8/24 |
| 11,374,639 | B2 * | 6/2022 | Li | H04W 72/046 |
| 11,381,296 | B2 * | 7/2022 | Islam | H04B 7/0617 |
| 11,382,136 | B2 * | 7/2022 | Deng | H04W 24/10 |
| 11,595,176 | B2 * | 2/2023 | Wei | H04W 72/20 |
| 11,611,404 | B2 * | 3/2023 | Jiang | H04B 17/0087 |
| 11,652,532 | B2 * | 5/2023 | Li | H04W 72/0446 370/329 |
| 11,728,859 | B2 * | 8/2023 | Pezeshki | H04W 72/51 375/267 |
| 11,791,882 | B2 * | 10/2023 | Islam | H04B 7/0639 370/329 |
| 11,838,088 | B2 * | 12/2023 | Bali | H04W 52/367 |
| 11,849,435 | B2 * | 12/2023 | Lee | H04W 74/0808 |
| 11,855,737 | B2 * | 12/2023 | Islam | H04W 28/0231 |
| 2019/0104549 | A1 * | 4/2019 | Deng | H04B 7/0617 |
| 2019/0132852 | A1 * | 5/2019 | Petersson | H04B 7/0634 |
| 2019/0199422 | A1 * | 6/2019 | Li | H04W 72/046 |
| 2019/0335430 | A1 * | 10/2019 | Ljung | H04W 16/28 |
| 2020/0052746 | A1 * | 2/2020 | Nammi | H04B 7/0417 |
| 2021/0234593 | A1 * | 7/2021 | Raghavan | H04B 7/0623 |
| 2021/0234604 | A1 * | 7/2021 | Raghavan | H04L 5/001 |
| 2021/0337426 | A1 * | 10/2021 | Lee | H04W 74/0816 |
| 2021/0360430 | A1 * | 11/2021 | Reial | H04W 56/001 |
| 2021/0376984 | A1 * | 12/2021 | Wei | H04L 5/0053 |
| 2022/0029679 | A1 * | 1/2022 | Pezeshki | H04B 7/0628 |
| 2022/0045742 | A1 * | 2/2022 | Abedini | H04W 72/0453 |
| 2022/0045745 | A1 * | 2/2022 | Abedini | H04B 7/026 |
| 2022/0045808 | A1 * | 2/2022 | Abedini | H04W 24/10 |
| 2022/0046618 | A1 * | 2/2022 | Abedini | H04B 7/155 |
| 2023/0043847 | A1 * | 2/2023 | Haustein | H04B 7/06966 |
| 2023/0083602 | A1 * | 3/2023 | Xing | H04L 5/0023 370/329 |
| 2023/0088577 | A1 * | 3/2023 | Raghavan | H04B 7/0628 375/267 |
| 2023/0155650 | A1 * | 5/2023 | Raghavan | H04B 7/0691 375/267 |

FOREIGN PATENT DOCUMENTS

| | | | | |
|---|---|---|---|---|
| AU | 2017249060 A1 * | 9/2018 | | H04B 7/0408 |
| AU | 2018215660 A1 * | 9/2019 | | H04B 7/0413 |
| AU | 2017271954 B2 * | 9/2020 | | H01Q 1/245 |
| AU | 2017249058 B2 * | 7/2021 | | H04B 7/0408 |
| AU | 2017249060 B2 * | 7/2021 | | H04B 7/0408 |
| AU | 2017249059 B2 * | 10/2021 | | H04B 7/0417 |
| AU | 2017271955 B2 * | 12/2021 | | H01Q 1/245 |
| AU | 2017271955 B9 * | 4/2022 | | H01Q 1/245 |
| AU | 2018215660 B2 * | 9/2022 | | H04B 7/0413 |
| AU | 2018215660 C1 * | 1/2023 | | H04B 7/0413 |
| CA | 3052785 A1 * | 8/2018 | | H04B 7/0413 |
| CN | 108024365 A * | 5/2018 | | H04B 7/0404 |
| CN | 108391315 A * | 8/2018 | | H04B 7/0404 |
| CN | 108391315 B * | 3/2019 | | H04B 7/0404 |
| CN | 109890080 A * | 6/2019 | | H04B 7/0404 |
| CN | 110313211 A * | 10/2019 | | H04B 7/0617 |
| CN | 109890080 B * | 3/2020 | | H04B 7/0404 |
| CN | 109964412 B * | 9/2020 | | H04B 1/1027 |
| CN | 112166647 A * | 1/2021 | | H04B 7/0626 |
| CN | 116567809 A * | 8/2023 | | H04B 7/0408 |
| CN | 116865814 A * | 10/2023 | | H01Q 1/245 |
| EP | 3503650 B1 * | 7/2020 | | H04B 7/04 |
| EP | 3465927 B1 * | 1/2021 | | H01Q 1/245 |
| EP | 3800799 A1 * | 4/2021 | | H01Q 1/245 |
| EP | 3826198 A1 * | 5/2021 | | H04B 7/0404 |
| EP | 3840242 A1 * | 6/2021 | | H04B 7/0404 |
| EP | 3840245 A1 * | 6/2021 | | H04B 7/0404 |
| EP | 3879881 A1 * | 9/2021 | | H04B 7/0617 |
| EP | 3902317 A1 * | 10/2021 | | H04B 17/318 |
| EP | 4007182 A1 * | 6/2022 | | H04B 7/0413 |
| EP | 4120655 A1 * | 1/2023 | | H04B 7/0617 |
| EP | 4145925 A1 * | 3/2023 | | H04B 7/0617 |
| EP | 3465931 B1 * | 5/2023 | | H01Q 1/245 |
| EP | 3800799 B1 * | 5/2023 | | H01Q 1/245 |
| EP | 4243301 A2 * | 9/2023 | | H04B 7/0408 |
| EP | 3465930 B1 * | 10/2023 | | H04B 7/0408 |
| EP | 3443683 B1 * | 1/2024 | | H04B 7/0417 |
| EP | 3465928 B1 * | 1/2024 | | H01Q 1/245 |
| ES | 2863411 T3 * | 10/2021 | | H04B 7/0617 |
| JP | 5248672 B2 * | 7/2013 | | H04B 7/0417 |
| JP | 5461517 B2 * | 4/2014 | | H04B 7/0417 |
| JP | 2014112898 A * | 6/2014 | | H04B 7/0417 |
| JP | 5710803 B2 * | 4/2015 | | H04B 7/0417 |
| JP | 6997180 B2 * | 1/2022 | | H04B 7/0617 |
| JP | 7014803 B2 * | 2/2022 | | H04B 7/0408 |
| JP | 7175903 B2 * | 11/2022 | | H04B 7/0413 |
| JP | 7278395 B2 * | 5/2023 | | H04B 17/318 |
| TW | 202010342 A * | 3/2020 | | H04B 7/0404 |
| TW | 202010345 A * | 3/2020 | | H04B 7/0404 |
| TW | 202010355 A * | 3/2020 | | H04B 7/0404 |
| WO | WO-2016086144 A1 * | 6/2016 | | H04B 7/0617 |
| WO | WO-2017180334 A1 * | 10/2017 | | H04B 7/0408 |
| WO | WO-2017180335 A1 * | 10/2017 | | H04B 7/0417 |
| WO | WO-2017180336 A1 * | 10/2017 | | H04B 7/0408 |
| WO | WO-2017204929 A1 * | 11/2017 | | H01Q 1/245 |
| WO | WO-2017204930 A1 * | 11/2017 | | H01Q 1/245 |
| WO | WO-2017204931 A1 * | 11/2017 | | H01Q 1/245 |
| WO | WO-2017204932 A1 * | 11/2017 | | H04B 7/0408 |
| WO | WO-2017204933 A1 * | 11/2017 | | H01Q 1/245 |
| WO | WO-2017204934 A1 * | 11/2017 | | H01Q 1/245 |
| WO | WO-2018090207 A1 * | 5/2018 | | H04B 1/1027 |
| WO | WO-2018127560 A1 * | 7/2018 | | H04B 7/0408 |
| WO | WO-2018145062 A2 * | 8/2018 | | H04B 7/0413 |
| WO | WO-2018156299 A1 * | 8/2018 | | H04B 7/0617 |
| WO | WO-2018228195 A1 * | 12/2018 | | H04B 7/0617 |
| WO | WO-2019080817 A1 * | 5/2019 | | H04B 7/0628 |
| WO | WO-2019086100 A1 * | 5/2019 | | H04B 7/0617 |
| WO | WO-2020032679 A1 * | 2/2020 | | H04B 7/0617 |
| WO | WO-2020034831 A1 * | 2/2020 | | H04B 7/0404 |
| WO | WO-2020034842 A1 * | 2/2020 | | H04B 7/0404 |
| WO | WO-2020067842 A1 * | 4/2020 | | H04B 7/0413 |
| WO | WO-2020119892 A1 * | 6/2020 | | H04B 7/0695 |
| WO | WO-2020164339 A1 * | 8/2020 | | H04B 17/318 |
| WO | WO-2021154707 A1 * | 8/2021 | | H04B 7/0478 |
| WO | WO-2021154734 A1 * | 8/2021 | | H04B 7/0456 |
| WO | WO-2021160689 A1 * | 8/2021 | | H04B 7/0617 |
| WO | WO-2021217668 A1 * | 11/2021 | | H04B 7/0617 |
| WO | WO-2022103504 A1 * | 5/2022 | | G01S 13/003 |
| WO | WO-2022103962 A2 * | 5/2022 | | |
| WO | WO-2022263883 A1 * | 12/2022 | | H04B 7/0617 |

* cited by examiner

HETEROGENOUS BEAMFORMING CAPABILITY WITH MIXED BEAMFORMING ARCHITECTURE

FIELD OF TECHNOLOGY

The following relates to wireless communications, including a heterogenous beamforming capability with a mixed beamforming architecture.

BACKGROUND

Wireless communications systems are widely deployed to provide various types of communication content. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). In some cases, a communication device may use beamforming to transmit or receive signals via multiple antennas or combinations of antennas, which may be arranged on one or more antenna panels or antenna modules. Antenna elements and other components, such as phase shifters, gain controls, couplers, and the like, may be arranged in a beamforming architecture, which may determine beamforming capabilities of the communication device. Additionally, some beamforming architectures may lead to lower power consumption and thermal overheads, while others may yield higher beamforming flexibility.

SUMMARY

Various aspects of the present disclosure relate to a communication device signaling beamforming capabilities related to various beamforming architectures supported by the communication device. For example, the communication device may be configured with a set of antenna modules (which may also be referred to as antenna panels), and each antenna module may have a respective beamforming architecture. Additionally or alternatively, an antenna module may be configured with multiple different beamforming architectures. The communication device may transmit control signaling indicating a set of beamforming configurations (e.g., one or more beamforming configurations) associated with the set of antenna modules, for example, based on corresponding beamforming architectures. The communication device may dynamically select sets of antenna elements (e.g., from the set of antenna modules) to use in generating a set of beam weights for beamformed communication based on respective beamforming configurations and in accordance with the control signaling.

In some examples, the communication device may determine a resource differential (e.g., a power differential, a thermal overhead differential) associated with each beamforming configuration of the set of beamforming configurations. The resource differential may indicate a difference in resource usage between respective beamforming architectures. The communication device may indicate the resource differential as part of the control signaling and, in some examples, may select antenna elements based on the resource differential. By implementing the signaling of beamforming capabilities related to various beamforming architectures, the communication device may promote high reliability and low latency wireless communication. Additionally or alternatively, by implementing signaling beamforming capabilities related to various beamforming architectures, the communication device may experience reduced power consumption.

A method for wireless communications at a user equipment (UE) is described. The method may include transmitting control signaling indicating a set of beamforming configurations associated with a set of antenna panels at the UE, selecting one or more antenna elements of at least one antenna panel of the set of antenna panels for wireless communication based on a beamforming configuration of the set of beamforming configurations and associated with the at least one antenna panel, generating a set of beam weights for the wireless communication based on the beamforming configuration and the one or more selected antenna elements of the at least one antenna panel, and transmitting the wireless communication using the generated set of beam weights.

An apparatus for wireless communications at a UE is described. The apparatus may include a processor, a memory coupled with the processor, wherein the memory comprises instructions executable by the processor to cause the apparatus to transmit control signaling indicating a set of beamforming configurations associated with a set of antenna panels at the UE, select one or more antenna elements of at least one antenna panel of the set of antenna panels for wireless communication based on a beamforming configuration of the set of beamforming configurations and associated with the at least one antenna panel, generate a set of beam weights for the wireless communication based on the beamforming configuration and the one or more selected antenna elements of the at least one antenna panel, and transmit the wireless communication using the generated set of beam weights.

Another apparatus for wireless communications at a UE is described. The apparatus may include means for transmitting control signaling indicating a set of beamforming configurations associated with a set of antenna panels at the UE, means for selecting one or more antenna elements of at least one antenna panel of the set of antenna panels for wireless communication based on a beamforming configuration of the set of beamforming configurations and associated with the at least one antenna panel, means for generating a set of beam weights for the wireless communication based on the beamforming configuration and the one or more selected antenna elements of the at least one antenna panel, and means for transmitting the wireless communication using the generated set of beam weights.

A non-transitory computer-readable medium storing code for wireless communications at a UE is described. The code may include instructions executable by a processor to transmit control signaling indicating a set of beamforming configurations associated with a set of antenna panels at the UE, select one or more antenna elements of at least one antenna panel of the set of antenna panels for wireless communication based on a beamforming configuration of the set of beamforming configurations and associated with the at least one antenna panel, generate a set of beam weights for the wireless communication based on the beamforming configuration and the one or more selected antenna elements of the at least one antenna panel, and transmit the wireless communication using the generated set of beam weights.

Some examples of the method, apparatuses, and non-transitory computer-readable medium described herein may further include operations, features, means, or instructions for determining a set of beamforming properties associated with the set of beamforming configurations, the control signaling further indicating the set of beamforming properties associated with the set of beamforming configurations, where selecting the one or more antenna elements of the at least one antenna panel of the set of antenna panels for the wireless communication may be further based on the set of beamforming properties.

In some examples of the method, apparatuses, and non-transitory computer-readable medium described herein, a first beamforming configuration associated with a first antenna panel of the set of antenna panels may be different than a second beamforming configuration associated with a second antenna panel of the set of antenna panels.

In some examples of the method, apparatuses, and non-transitory computer-readable medium described herein, a first beamforming property associated with a first subset of antenna elements of the at least one antenna panel may be different than a second beamforming property associated with a second subset of antenna elements of the at least one antenna panel.

Some examples of the method, apparatuses, and non-transitory computer-readable medium described herein may further include operations, features, means, or instructions for determining a threshold number of the set of beam weights associated with each beamforming configuration of the set of beamforming configurations, the control signaling further indicating the threshold number of the set of beam weights associated with each beamforming configuration of the set of beamforming configurations, where selecting the one or more antenna elements of the at least one antenna panel of the set of antenna panels for the wireless communication may be further based on the threshold number of the set of beam weights.

Some examples of the method, apparatuses, and non-transitory computer-readable medium described herein may further include operations, features, means, or instructions for determining a number of beam weights associated with each beamforming configuration of the set of beamforming configurations, the control signaling further indicating the number of beam weights associated with each beamforming configuration of the set of beamforming configurations, where selecting the one or more antenna elements of the at least one antenna panel of the set of antenna panels for the wireless communication may be further based on the number of beam weights.

Some examples of the method, apparatuses, and non-transitory computer-readable medium described herein may further include operations, features, means, or instructions for receiving second control signaling indicating the beamforming configuration, where selecting the one or more antenna elements of the at least one antenna panel of the set of antenna panels for the wireless communication may be further based on the received second control signaling.

Some examples of the method, apparatuses, and non-transitory computer-readable medium described herein may further include operations, features, means, or instructions for determining a resource differential associated with each beamforming configuration of the set of beamforming configurations, the control signaling indicating the resource differential associated with each beamforming configuration of the set of beamforming configurations, where selecting the one or more antenna elements of the at least one antenna panel of the set of antenna panels for the wireless communication may be further based on the resource differential.

In some examples of the method, apparatuses, and non-transitory computer-readable medium described herein, the resource differential includes one or both of a power differential associated with each beamforming configuration of the set of beamforming configurations or a thermal overhead differential associated with each beamforming configuration of the set of beamforming configurations.

Some examples of the method, apparatuses, and non-transitory computer-readable medium described herein may further include operations, features, means, or instructions for receiving a request for an indication of a beamforming capability at the UE, where transmitting the control signaling indicating the set of beamforming configurations associated with the set of antenna panels at the UE may be further based on the request for the indication of the beamforming capability at the UE.

In some examples of the method, apparatuses, and non-transitory computer-readable medium described herein, the set of beamforming configurations includes one or both of a Butler matrix beamforming architecture or a vector sum modulator beamforming architecture or a lens array architecture.

A method for wireless communications at a base station is described. The method may include receiving control signaling indicating a set of beamforming configurations associated with a set of antenna panels at a UE and receiving wireless communication according to a generated set of beam weights, the generated set of beam weights based on a beamforming configuration of the set of beamforming configurations and associated with at least one antenna panel of the set of antenna panels.

An apparatus for wireless communications at a base station is described. The apparatus may include a processor, a memory coupled with the processor, wherein the memory comprises instructions executable by the processor to cause the apparatus to receive control signaling indicating a set of beamforming configurations associated with a set of antenna panels at a UE and receive wireless communication according to a generated set of beam weights, the generated set of beam weights based on a beamforming configuration of the set of beamforming configurations and associated with at least one antenna panel of the set of antenna panels.

Another apparatus for wireless communications at a base station is described. The apparatus may include means for receiving control signaling indicating a set of beamforming configurations associated with a set of antenna panels at a UE and means for receiving wireless communication according to a generated set of beam weights, the generated set of beam weights based on a beamforming configuration of the set of beamforming configurations and associated with at least one antenna panel of the set of antenna panels.

A non-transitory computer-readable medium storing code for wireless communications at a base station is described. The code may include instructions executable by a processor to receive control signaling indicating a set of beamforming configurations associated with a set of antenna panels at a UE and receive wireless communication according to a generated set of beam weights, the generated set of beam weights based on a beamforming configuration of the set of beamforming configurations and associated with at least one antenna panel of the set of antenna panels.

In some examples of the method, apparatuses, and non-transitory computer-readable medium described herein, the control signaling further indicates a set of beamforming properties associated with the set of beamforming configurations.

In some examples of the method, apparatuses, and non-transitory computer-readable medium described herein, the control signaling further indicates a threshold number of the set of beam weights associated with each beamforming configuration of the set of beamforming configurations.

In some examples of the method, apparatuses, and non-transitory computer-readable medium described herein, the control signaling further indicates a number of beam weights associated with each beamforming configuration of the set of beamforming configurations.

Some examples of the method, apparatuses, and non-transitory computer-readable medium described herein may further include operations, features, means, or instructions for transmitting second control signaling indicating the beamforming configuration, where receiving the wireless communication according to the generated set of beam weights may be based on transmitting the second control signaling.

In some examples of the method, apparatuses, and non-transitory computer-readable medium described herein, the control signaling further indicates a resource differential associated with each beamforming configuration of the set of beamforming configurations.

In some examples of the method, apparatuses, and non-transitory computer-readable medium described herein, the resource differential includes one or both of a power differential associated with each beamforming configuration of the set of beamforming configurations or a thermal overhead differential associated with each beamforming configuration of the set of beamforming configurations.

Some examples of the method, apparatuses, and non-transitory computer-readable medium described herein may further include operations, features, means, or instructions for transmitting a request for an indication of a beamforming capability at the UE, where receiving the control signaling indicating the set of beamforming configurations associated with the set of antenna panels at the UE may be further based on the request for the indication of the beamforming capability at the UE.

In some examples of the method, apparatuses, and non-transitory computer-readable medium described herein, the set of beamforming configurations includes one or both of a Butler matrix beamforming architecture or a vector sum modulator beamforming architecture or a lens array architecture.

DETAILED DESCRIPTION

Figure 1:
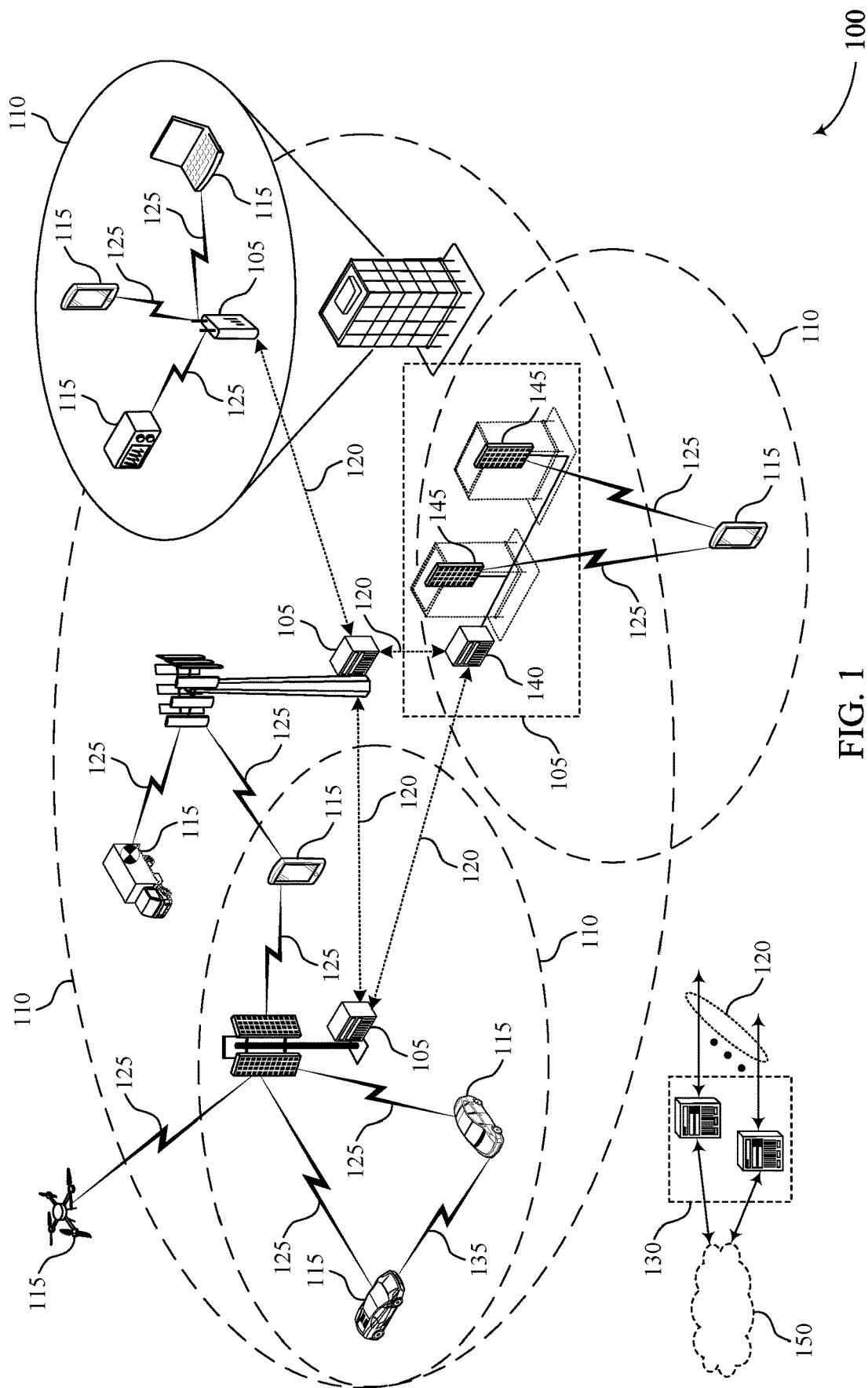
FIGS. 1 and 2 illustrate examples of wireless communications systems that support a heterogenous beamforming capability with a mixed beamforming architecture in accordance with aspects of the present disclosure.

A wireless communications system may include communication devices, such as a UE or a base station (e.g., an eNodeB (eNB), a next-generation NodeB or a giga-NodeB, any of which may be referred to as a gNB, or some other base station), that may support multiple radio access technologies. Examples of radio access technologies include 4G systems, such as LTE systems, and 5G systems, which may be referred to as NR systems. A communication device may be configured with multiple antenna panels to support beamformed communications with multiple other communication devices, for example, in a multiple-input multiple output (MIMO) deployment. The communication device may support beamformed communication, for example, using beams to orient transmissions over one or more beam directions.

In some cases, a communication device may support beamformed communications, in which the communication device shapes or steers a beam in a respective direction. Beamforming operations may be performed by the communication device using multiple antennas or combinations of antennas associated with a beamforming architecture, which may impact beamforming capabilities and restrictions. For example, some other different beamforming architectures (e.g., a vector sum modulator architecture) may support flexible or customizable beamforming (e.g., steering direction of the beam, beamwidth of the beam, side lobe levels, etc.), but may be associated with higher power consumption and thermal overhead. Alternatively, other different beamforming architectures (e.g., a Butler matrix or a lens array architecture) may be bound to a fixed set of beams directions, beamwidths, or side lobe levels, or any combination thereof, but may consume less power and thus also be associated with a lower thermal overhead.

A communication device may operate over various radio frequencies. In some cases, when the communication device operates at relatively high frequencies (e.g., above a threshold so that the wavelength is on the order of a few millimeters or smaller), the communication device may rely on beamformed communications to meet a link budget, as beamforming may improve the array gain and hence increase rate or reliability, or both. The communication device may be configured with multiple beamforming architectures to support a wide variety of beamforming operations. For example, the communication device may be configured with different types of beamforming architectures arranged on multiple antenna modules. Each antenna module may be associated with one or more types of beamforming architectures; the communication device may be capable of adapting beamforming procedures based on properties of each beamforming architecture.

In some cases, other communication devices with which the communication device communicates may be unaware of the communication device's beamforming capabilities, which may impact communications at the communication device. For example, a base station may determine parameters (e.g., transmit power, modulation and coding scheme (MCS), or the like) for communications with a UE that may be impacted by beamforming procedures. Without knowledge of beamforming capabilities of the UE, the base station may be unable to select appropriate parameters for beamformed communications with the UE. Various aspects of the present disclosure relate to the communication device (e.g., a UE) signaling beamforming capabilities associated with beamforming architectures at the communication, which may provide efficient resource usage and increased flexibility for beamformed communications with the communication device.

For example, the communication device may transmit control signaling to indicate a set of beamforming configurations associated with a set of antenna panels at the communication device, where the set of beamforming configurations indicate beamforming capabilities associated with corresponding beamforming architectures of the set of antenna panels. Another communication device (e.g., a base station) receiving the indication may determine or adjust communications parameters based on the set of beamforming configurations. In some examples, the other communication device may dynamically instruct the communication device to use a given beamforming configuration. The communication device may select antenna elements to generate a set of beam weights based on a corresponding beamforming configuration, and may use the generated set of beam weights for a beamformed transmission.

In some cases, each beamforming configuration may be associated with one or more beamforming properties, beam weights, or both, and the communication device may select antenna elements accordingly. For example, a beamforming architecture corresponding to a beamforming configuration may be capable of generating beams having a set of beamforming properties (e.g., gain, amplitude, phase, beamwidth, or the like). Additionally or alternatively, the beamforming architecture may be capable of generating a set of beam weights, which may be fixed or variable. In some examples, the communication device may include, in the control signaling, indications of the beamforming properties, the beam weights, or the like, associated with the set of beamforming configurations.

By implementing the signaling of beamforming capabilities related to various beamforming architectures, the communication device may assist with higher reliability and lower latency wireless communication. The communication device may also manage resource utilization by implementing signaling beamforming capabilities related to various beamforming architectures. Additionally or alternatively, by implementing signaling beamforming capabilities related to various beamforming architectures, the communication device may experience reduced power consumption.

Aspects of the disclosure are initially described in the context of wireless communications systems. Aspects of the disclosure are then discussed with reference to device architectures and a process flow. Aspects of the disclosure are further illustrated by and described with reference to apparatus diagrams, system diagrams, and flowcharts that relate to heterogenous beamforming capability with a mixed beamforming architecture.

FIG. 1 illustrates an example of a wireless communications system 100 that supports heterogenous beamforming capability with a mixed beamforming architecture in accordance with aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or an NR network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or another interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology). The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers. In some examples, a carrier may support multiple cells, and different cells may be configured according to different protocol types (e.g., MTC, narrowband IoT (NB-IoT), enhanced mobile broadband (eMBB)) that may provide access for different types of devices.

A base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions.

Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with an orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 operating in the wireless communications system 100 may communicate using beamformed transmissions based on a beamforming architecture at the UE 115. For example, the UE 115 may have multiple antenna panels (such as, antenna modules, antenna arrays), where each antenna panel includes multiple antenna elements. Each antenna element may be associated with one or more radio frequency (RF) components, such as phase shifters, couplers, and the like. A beamforming architecture may refer to composition (e.g., quantities and types of components) and arrangement of these components (e.g., on an antenna panel or antenna subpanel), and may determine beamforming capabilities and restrictions of the UE 115. Composition of the architecture could include descriptions of the radio frequency circuitry that lead to the phase shifting or gain control operations, or both. Examples of such composition include vector sum modulator, Butler matrix, lens array, etc. That is, beamforming properties (e.g., phase, amplitude, orientation, beam width) of beams generated by the UE 115 may depend on the beamforming architecture at the UE 115.

Different beamforming architectures may provide different beamforming capabilities and be associated with different restrictions. A UE 115 may be configured with multiple types of beamforming architectures. For example, some antenna panels may be associated with a first type of beamforming architecture, while other antenna panels may be associated with a second type of beamforming architecture. Additionally or alternatively, multiple types of beamforming architectures may be associated with different subarrays or antenna elements on a single antenna panel. The UE 115 may dynamically select one or more antenna elements from one or more antenna panels to generate a beamformed transmission based on capabilities of the corresponding beamforming architecture(s) and associated beamforming configuration(s). That is, the UE 115 may generate a set of beam weights based on the selected antenna element(s) and may transmit beamformed communication using the generated set of beam weights.

Various aspects of the present disclosure relate to sharing of capability information related to beamforming architectures at a communication device, such as one or both of a base station 105 or a UE 115, to improve overall beamformed communications reliability and efficiency. For example, a UE 115 may transmit control signaling to one or more other communication devices (e.g., UEs 115, base stations 105) indicating a set of beamforming configurations associated with a set of antenna panels at the UE 115. The UE 115 may include, in the control signaling, indications of beamforming properties, beam weights, or the like, associated with the set of beamforming configurations. In some examples, the UE 115 may indicate information related to tradeoffs between the beamforming configurations in the set of beamforming configurations (e.g., based on the corresponding beamforming architectures). Additionally, the UE 115 may identify or otherwise determine a resource differential associated with each of the beamforming configurations, such as a power differential, a thermal overhead differential, or a combination thereof. The UE 115 may include an indication of the resource differential in the control signaling.

A base station 105 receiving the control signaling may determine or adjust communications parameters based on the set of beamforming configurations, and may receive the wireless communication in accordance with the generated set of beam weights. In some examples, the base station 105 may dynamically instruct the UE 115 to use a given beamforming configuration (e.g., by transmitting control signaling indicating the beamforming configuration). For example, the base station 105 may indicate that the UE 115 is to use a beamforming configuration based on an associated resource differential indicated by the UE 115. Additionally or alternatively, the base station 105 may transmit, to the UE 115, a request for an indication of a beamforming capability at the UE 115, and the UE 115 may transmit the control signaling based on receiving the request.

By implementing the signaling of beamforming capabilities related to various beamforming architectures, the UE 115 may promote high reliability and low latency wireless communication. The UE 115 may also manage resource utilization by implementing signaling beamforming capabilities related to various beamforming architectures. Additionally or alternatively, by implementing signaling beamforming capabilities related to various beamforming architectures, the UE 115 may experience reduced power consumption.

Figure 2:
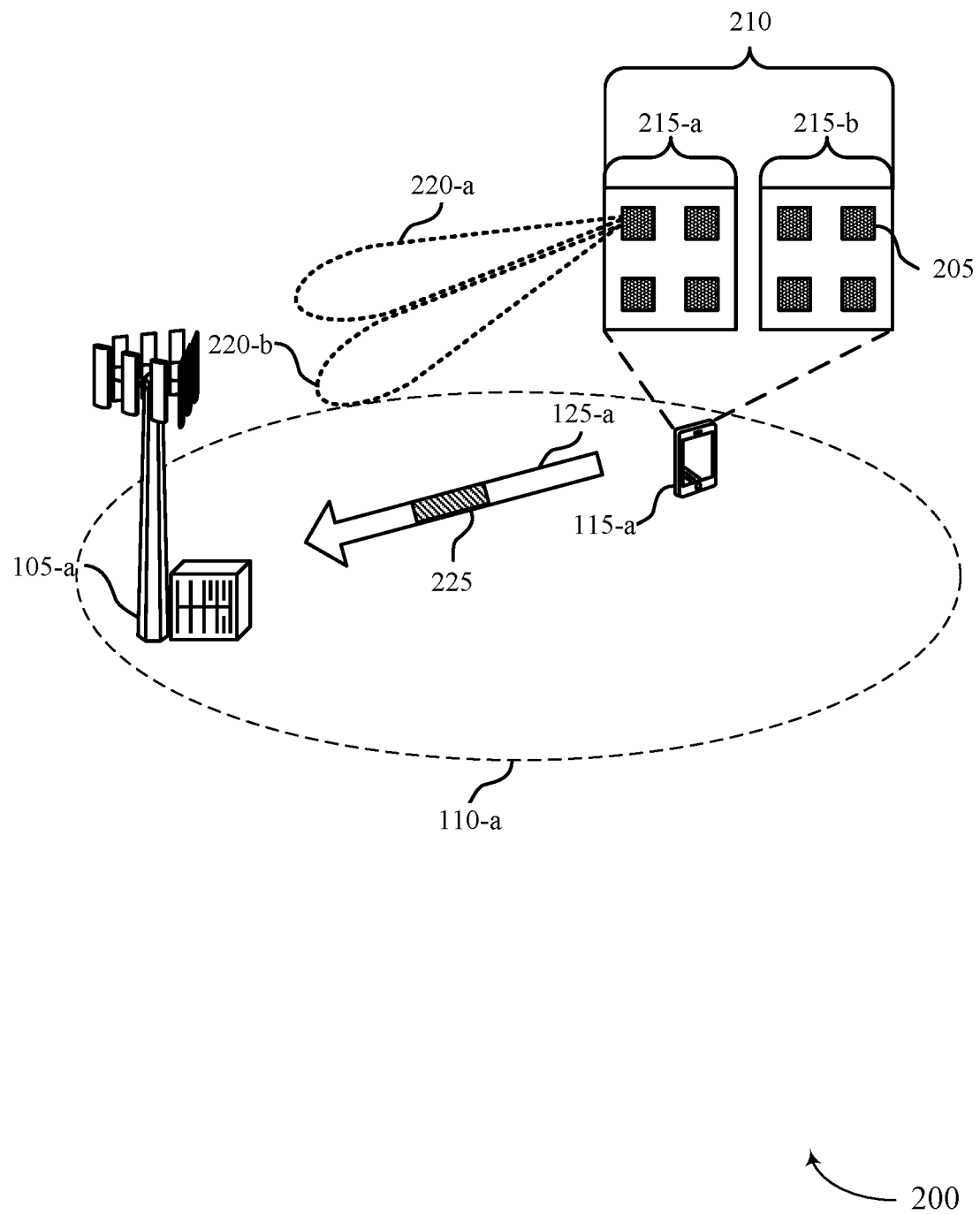

FIG. 2 illustrates an example of a wireless communications system 200 that supports heterogenous beamforming capability with a mixed beamforming architecture in accordance with aspects of the present disclosure. In some examples, the wireless communications system 200 may implement or be implemented by aspects of the wireless communications system 100. For example, the wireless communications system 200 may include a base station 105-a and a UE 115-a, which may be examples of a base station 105 and a UE 115 as described with reference to FIG. 1. The wireless communications system 200 may support beamforming and, as such, the base station 105-a and the UE 115-a may transmit or receive beamformed communications over a communication link 125-a within a geographic coverage area 110-a.

The base station 105-a and the UE 115-a may be configured with multiple antennas located within one or more antenna arrays or antenna panels. As illustrated in FIG. 2, the UE 115-a may include multiple antenna elements 205 arranged in an antenna panel configuration 210 that includes, for example, two antenna panels 215-a and 215-b. Each antenna panel 215-a and 215-b may include multiple antenna elements 205 (e.g., circuit elements). The UE 115-a may transmit and receive downlink and uplink transmissions using the antenna panels 215. The antenna panels 215 may include beamforming architectures (e.g., associated with beamforming configurations) that enable the UE 115-a to perform beamforming operations to generate one or more beams 220. For example, the antenna panel 215-a may include a first beamforming architecture and the antenna panel 215-b may include a second beamforming architecture.

A beamforming architecture may support a set of beamforming configurations, which in turn may be associated with one or more beamforming properties, beam weights, or both, based on components included in the beamforming architecture. Some beamforming architectures may be capable of generating relatively large quantities of beam weights (e.g., amplitudes and phases), which may provide increased flexibility and granularity in beam generation. For instance, a vector sum modulator architecture may include customizable phase shifters, customizable amplitude/gain control, or the like, and may produce arbitrary beam weights (within the quantization limits) such that the UE 115-*a* may support relatively high adaptability in beamforming. That is, by using different beam weights, the UE 115-*a* may adjust various properties of a generated beam with good accuracy. A vector sum modulator may enable the UE 115-*a* to steer a main lobe of a beam in arbitrary directions (up to a quantization level based on phase shifter and/or amplitude control precision), modify a beamwidth, adjust side lobe levels, create multiple lobes, increase or reduce interference, or the like. However, such beamforming architectures may consume significant power (at both the radio frequency and the baseband level) and, as a result, may generate significant thermal overhead.

In contrast, some beamforming architectures may consume fewer resources, but may be restricted in types and quantities of beams generated. A Butler matrix may include fixed phase shifters (e.g., fixed-value phase shifters), hybrid couplers, and the like, capable of generating a fixed quantity of beams in limited orientations (e.g., main lobes may be steered in a finite quantity of directions). For instance, a Butler matrix may include N input ports and N output ports to produce N fixed, orthogonal, and simultaneously steerable beams. Unlike a vector sum modulator, which may produce arbitrarily (within a quantization precision) phase-shifted beams, a Butler matrix may be confined to progressive phase shifts. A Butler matrix may generate a fixed set of beam weights. That is, a Butler matrix may generate a threshold quantity of beam weights that have fixed values. Additionally, some beamforming properties, such as beamwidths, side lobe levels, or the like, may be dependent on antenna dimensions and may not be adjustable.

In addition to power and thermal constraints, different beam architectures may occupy relatively larger or smaller areas on a chip. In some scenarios, such as in relatively high frequency (e.g., mmW and above) operations, MIMO communications, and the like, area savings may translate to cost savings, especially as the number of antenna elements and antenna modules on the UE 115-*a* increases. For instance, a Butler matrix may be relatively compact and may occupy a smaller chip area, while a vector sum modulator may occupy a larger chip area.

Different beam architectures may provide different beamforming capabilities and be associated with different constraints at the UE 115-*a*. In the example of FIG. 2, the UE 115-*a* may be configured with mixed beamforming architectures and beamforming configurations. For instance, the antenna panel 215-*a* may be associated with a Butler matrix and may be capable of generating a fixed set of beam weights within a threshold quantity of beam weights. The antenna panel 215-*b* may be associated with a vector sum modulator and may be capable of generating arbitrary beam weights. The UE 115-*a* may dynamically select one or more antenna elements 205 from one or both antenna panels 215 to generate a beamformed transmission based on capabilities of the corresponding beamforming architecture(s) and associated beamforming configuration(s).

For example, to transmit wireless communication to the base station 105-*a*, the UE 115-*a* may generate the beams 220-*a* and 220-*b* based on a set of beam weights associated with the antenna panel 215-*a*. The UE 115-*a* may select antenna elements 205 from the antenna panel 215-*a* based on beamforming capabilities (e.g., beamforming configurations) associated with the antenna panel 215-*a*. For instance, the UE 115-*a* may determine that the beams 220-*a* and 220-*b* are to be transmitted with a narrow beamwidth such that the Butler matrix of the antenna panel 215-*a* is sufficient for beamforming. As an alternative example, if the beams 220-*a* and 220-*b* are to be generated in a direction outside of the capabilities of the Butler matrix, the UE 115-*a* may select antenna elements 205 from the antenna panel 215-*b* associated with the vector sum modulator. The UE 115-*a* may generate the set of beam weights and may transmit the wireless communication to the base station 105-*a* using the generated set of beam weights.

In some cases, the UE 115-*a* may evaluate a tradeoff between resource usage (e.g., thermal overhead, power consumption, etc.), beamwidth, gain, beam weight adaptability, and the like, associated with each beamforming architecture (e.g., each beamforming configuration). For example, the UE 115-*a* may prioritize conserving power, and the UE 115-*a* may select antenna elements 205 associated with a Butler matrix despite the directional constraints. Alternatively, the UE 115-*a* may determine that increased power consumption is amortized by steering a beam in a direction with relatively high precision, adjusting other beamforming properties, or the like, and may select antenna elements 205 associated with a vector sum modulator. In some examples, the UE 115-*a* may identify a resource differential (e.g., a resource cost) associated with each beamforming configuration (e.g., based on a tradeoff). The UE 115-*a* may determine a power differential associated with a beamforming configuration of the antenna panel 215-*a* and a beamforming configuration of the antenna panel 215-*b*. The power differential may indicate a difference in power consumption between the antenna panels 215 for generating a same set of beam weights having a same set of beam properties.

While FIG. 2 is described with reference to a vector sum modulator and a Butler matrix, other beamforming architectures, supporting variable levels of flexibility, may be implemented in accordance with the techniques described herein. In some cases, dynamic antenna selection, and corresponding beamforming adaptations, at the UE 115-*a* may impact communications with other devices in the wireless communications system 200. For instance, steerability of a beam may influence achievable gain of a transmission. The base station 105-*a* may determine parameters for communications with the UE 115-*a*, such as a transmit power, to satisfy a link budget; restrictions in steerability may render the UE 115-*a* unable to meet the link budget. Accordingly, the techniques described herein support sharing of capability information related to beamforming architectures at a device, such as the UE 115-*a*, to improve overall communications reliability and efficiency. In the example of FIG. 2, the UE 115-*a* may transmit control signaling 225 to the base station 105-*a* indicating such capability information, and the base station 105-*a* may, for instance, increase a transmit power or adjust other parameters to avoid communication failure.

The control signaling 225 may indicate a set of beamforming configurations associated with one or both antenna panels 215 at the UE 115-*a*. Put another way, the control signaling 225 may indicate a beamforming capability of the UE 115-*a* based on the set of beamforming configurations. In some cases, the control signaling may include a capability field. In some examples, the UE 115-*a* may include, in the control signaling 225, indications of beamforming properties, beam weights, or the like, associated with the set of beamforming configurations. For example, the UE 115-*a* may indicate, via control signaling 225, that the antenna panel 215-*a* supports a fixed set of beam weights and/or a fixed quantity of beam weights, while the antenna panel 215-*b* supports arbitrary beam weights. The indication may be binary and may indicate that a given antenna panel 215 supports a fixed set of beam weights or an arbitrary set of beam weights.

Additionally or alternatively, the control signaling 225 may indicate additional capability information associated with the beamforming architectures and beamforming configurations of the UE 115-*a*. The control signaling may implicitly or explicitly indicate beamforming capabilities of the antenna panels 215. For instance, the control signaling 225 may indicate a set of beam weights, a quantity of supported beam weights, a threshold quantity of beam weights, or the like. The UE 115-*a* may transmit control signaling including the indication for each antenna panel 215 or for the set of antenna panels 215.

In some cases, the UE 115-*a* may indicate information related to tradeoffs between the beamforming configurations in the set of beamforming configurations, for example, based on the corresponding beamforming architectures of the antenna panels 215. As an example, the UE 115-*a* may indicate a power consumption parameter, a thermal overhead parameter, or the like associated with an antenna panel 215. Additionally or alternatively, the UE 115-*a* may indicate a comparison between beamforming configurations. The UE 115-*a* may identify or otherwise determine a resource differential associated with each of the beamforming configurations, such as a power differential, a thermal overhead differential, or a combination thereof, and may include an indication of the resource differential in the control signaling.

The base station 105-*a* receiving the control signaling may determine or adjust communications parameters based on the indicated set of beamforming configurations (e.g., based on the beamforming capabilities of the UE 115-*a*). In some examples, the base station 105-*a* may dynamically instruct the UE 115-*a* to use a given beamforming configuration to transmit a wireless communication, for example, by transmitting control signaling indicating the beamforming configuration. For example, the base station 105-*a* may indicate that the UE 115-*a* is to use a beamforming configuration associated with the antenna panel 215-*a* based on an associated resource differential indicated by the UE 115-*a*, a carrier frequency for a subsequent transmission, or the like. In such cases, the UE 115-*a* may select antenna elements 205 for generating the set of beam weights based on the indication from the base station 105-*a*, for example, in accordance with the indicated beamforming configuration. In some examples, the UE 115-*a* may transmit the control signaling 225 based on receiving, from the base station 105-*a*, a request for an indication of a beamforming capability at the UE 115-*a*. Additionally or alternatively, the UE 115-*a* may transmit the control signaling 225 as an initial message when establishing a connection with the base station 105-*a*.

By implementing the signaling of beamforming capabilities related to various beamforming architectures, the UE 115-*a* may promote high reliability and low latency wireless communication. The UE 115-*a* may also manage resource utilization by implementing signaling beamforming capabilities related to various beamforming architectures. Additionally or alternatively, by implementing signaling beamforming capabilities related to various beamforming architectures, the UE 115-*a* may experience reduced power consumption.

Figure 3A:
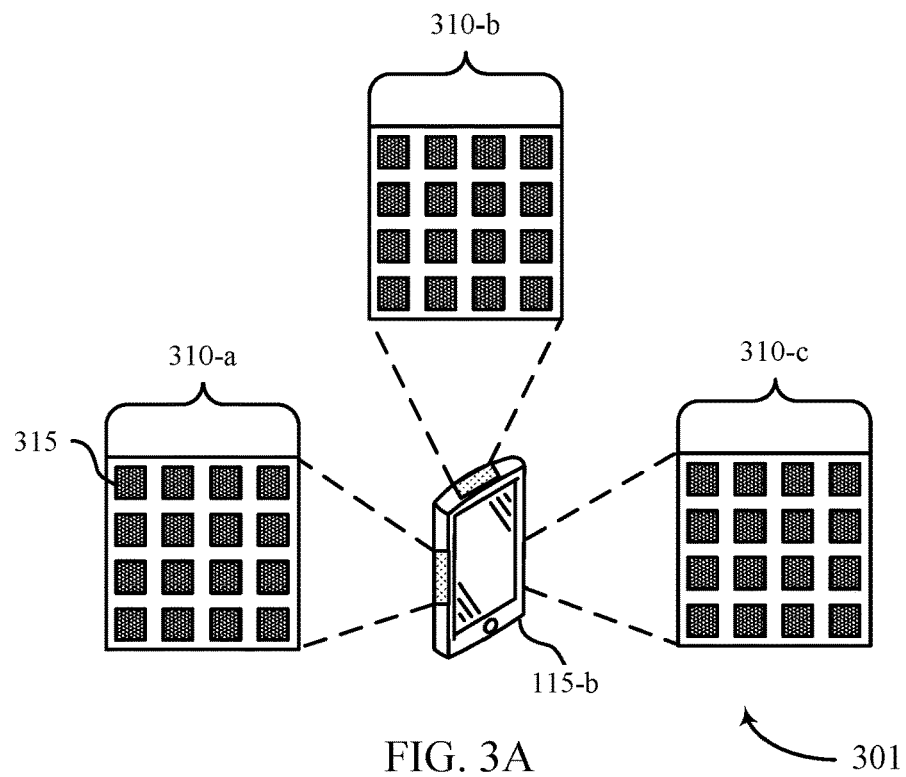
FIGS. 3A and 3B illustrate examples of antenna panel configurations that support a heterogenous beamforming capability with a mixed beamforming architecture in accordance with aspects of the present disclosure.
Figure 3B:
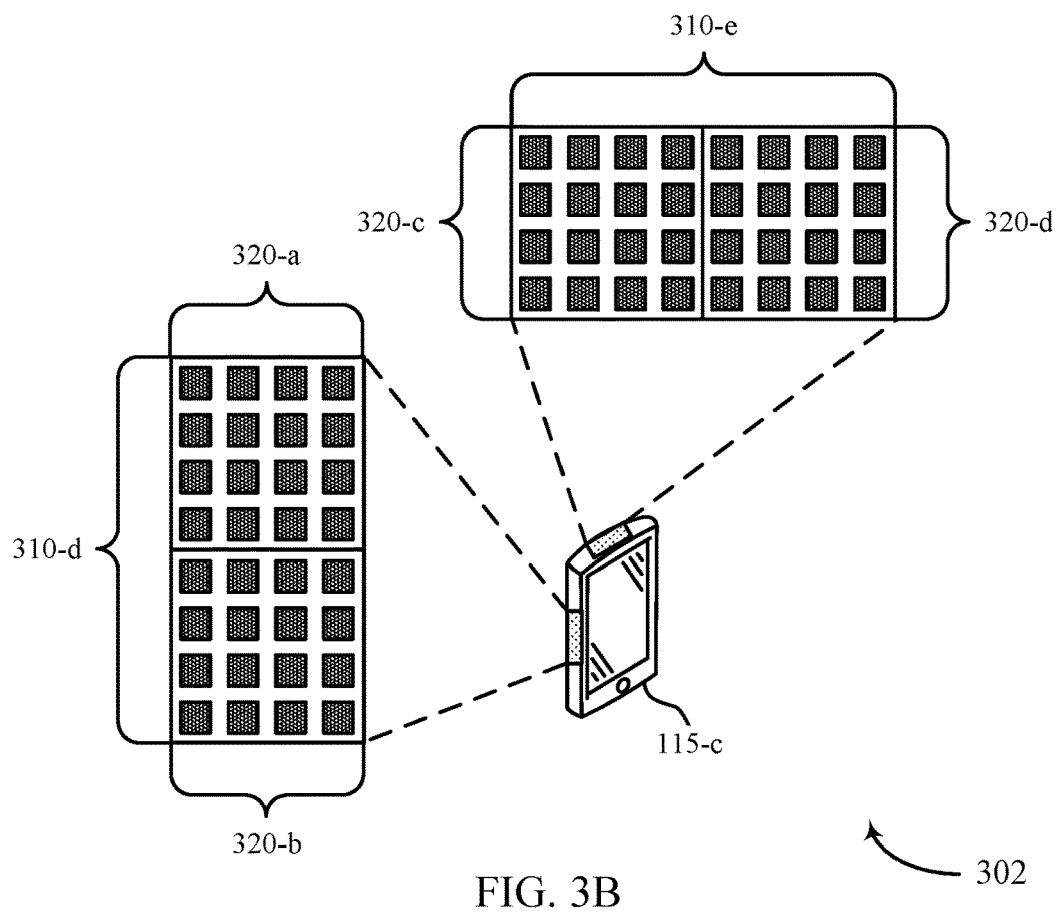

FIGS. 3A and 3B illustrate examples of antenna panel configurations 301 and 302, respectively, that support heterogenous beamforming capability with a mixed beamforming architecture in accordance with aspects of the present disclosure. In some examples, the antenna panel configurations 301 and 302 may implement or be implemented by aspects of the wireless communications system 100 or 200. For example, the antenna panel configurations 301 and 302 may be examples of antenna arrays (e.g., antenna modules) implemented at a UE 115-*b* and a UE 115-*c*, respectively, which may be examples of the corresponding devices described herein. Each antenna panel configuration 301 and 302 may include a set of antenna panels 310, where each antenna panel 310 includes a number of antenna elements 315. It is noted that the dimensions of the antenna panel configurations 301 and 302 are provided for illustrative purposes and should not be considered limiting, as antenna arrays having different sizes, configurations, or dimensions are also possible. Additionally, while the antenna panel configurations 301 and 302 illustrate specific quantities of antenna arrays, any number and configuration of antenna arrays may be used.

As described with reference to FIG. 2, the UE 115-*b* and the UE 115-*c* may each include a set of antenna panels 310, and each antenna panel 310 may be associated with one or more beamforming architectures and beamforming configurations. The antenna panels 310 may be situated at respective locations of the UEs 115 to produce beams aimed (e.g., steered) in corresponding directions. That is, the antenna panel configurations 301 and 302 may be examples of antenna configurations strategically located and designed to provide spherical coverage for and around the UEs 115 (e.g., to reduce blockage and improve robustness in beam switching).

FIG. 3A illustrates the UE 115-*b* with an antenna panel 310-*a*, an antenna panel 310-*b*, and an antenna panel 310-*c*. The antenna panels 310 of the UE 115-*b* may be associated with a set of beamforming configurations (e.g., one or more beamforming architectures). In some cases, respective beamforming configurations may be different for each antenna panel 310. For example, a first beamforming configuration associated with the antenna panel 310-*a* may be different than a second beamforming configuration associated with the antenna panel 310-*c*. In some examples, the antenna panels 310-*a* and 310-*b* may be associated with Butler matrix architectures, while the antenna panel 310-*c* may be associated with a vector sum modulator architecture.

A Butler matrix may be an example of a beamforming matrix associated with the antenna panel 310-*a* for beamforming at the UE 115-*b*. A Butler matrix may be characterized by an N by N matrix of connections between input and output ports, with multiple beam steering capabilities, and may be used for unified array antennas having N outputs connected to antenna elements (e.g., antenna elements 315) and N inputs. The N inputs may represent or may be examples of N orthogonal beam ports (e.g., antenna ports). A Butler matrix may, for instance, include eight inputs that are passed through (e.g., along respective signal paths) a combination of hybrid couplers fixed phase shifters to generate eight outputs. A signal (e.g., a transmission) may be beamformed by being routed along one or more corresponding signal paths through associated hybrid couplers and fixed phase shifters, such that an associated output is a beamformed signal.

A Butler matrix may be associated with one or both of a set of beamforming configurations having relatively threshold quantities of beam weights or constraints in beamforming properties. For instance, a Butler matrix may be capable of generating narrow beamwidth beams, and the UE 115-*b* may use a Butler matrix to establish a directional link over clusters in a channel with narrow angular spreads. Additionally, the Butler matrix may be bound to a fixed set of beam weights (e.g., N beam weights) to generate beams in a fixed set of directions (e.g., N directions). However, the Butler matrix may provide significant power savings, occupy less area on a chip of the UE 115-*b*, and lead to less thermal overhead.

A vector sum modulator may, in contrast, include multiple variable phase shifters and customizable amplitude components, which may be associated with relatively higher levels of quantization (e.g., as compared to a Butler matrix). A vector sum modulator may support arbitrary beam weights, which may enable the UE 115-*b* to exert relatively more detailed control in beamforming. For example, the UE 115-*b* may steer a beam's main lobe in a wide variety of directions and orientations, adjust a beamwidth (which may be relatively wider than a beamwidth associated with a Butler matrix), generate multiple beam lobes, or the like. The vector sum modulator may be associated with larger chip area and increased power consumption, which may, in turn, produce increased thermal overhead, as compared to a Butler matrix.

The UE 115-*b* may select antenna elements 315 from one or more of the antenna panels 310 for wireless communication, based on corresponding beamforming configurations, to optimize beamforming procedures. That is, the UE 115-*b* may dynamically select antenna elements 315 and antenna panels 310 based on beamforming properties and capabilities of the corresponding beamforming configurations. For instance, at high frequencies (such as SHF, EHF, or mmW band and beyond, or any combination thereof), power savings associated with a Butler matrix may be significant. The UE 115-*b* may select antenna elements 315 from the antenna panel 310-*a* or the antenna panel 310-*b* for the wireless communication to experience the power saving. Alternatively, the UE 115-*b* may transmit the wireless communication using a multi-lobe beam, and may select antenna elements 315 from the antenna panel 310-*c* (e.g., as the vector sum modulator may support multi-lobe beamforming). For example, the UE 115-*b* may determine a set of beamforming properties associated with the set of beamforming configurations and may select antenna elements 315 based on the set of beamforming properties. Additionally or alternatively, the UE 115-*b* may select antenna elements 315 based on a number of beam weights or a threshold number of beam weights associated with a beamforming configuration of an antenna panel 310. In any case, the UE 115-*b* may generate a set of beam weights based on selecting the antenna elements 315 and may transmit the wireless communication using the generated beam weights.

In some cases, the UE 115-*b* may identify or otherwise determine a cost analysis associated with each of the antenna panels 310 based on the corresponding beamforming configurations. For instance, generating beam weights to meet a set of beamforming properties using the antenna panel 310-*a* (e.g., associated with a Butler matrix) may be associated with a level of power consumption or thermal overhead that may be different than generating beam weights to meet the same set of beamforming properties using the antenna panel 310-*c* (e.g., associated with a vector sum modulator). The UE 115-*b* may, in some cases, determine a resource differential between antenna panels 310, such as a power differential or a thermal overhead differential, that indicates a relative difference in resource consumption in generating beam weights using respective antenna panels 310.

The UE 115-*b* may, in accordance with the techniques described herein, transmit control signaling indicating the set of beamforming configurations associated with the antenna panels 310. The control signaling may indicate a beamforming capability of the UE 115-*b* based on the set of beamforming configurations (e.g., as described with reference to FIG. 2). In some cases, the control signaling may include an indication of the beamforming properties, number of beam weights, threshold number of beam weights, resource differential(s), or the like. The UE 115-*b* may transmit control signaling including the indication for each antenna panel 310 or for the set of antenna panels 310. For example, the UE 115-*b* may indicate, via control signaling, that the antenna panel 310-*a* and the antenna panel 310-*b* support a fixed set of beam weights and/or a fixed quantity of beam weights, while the antenna panel 310-*c* supports arbitrary beam weights. The indication may be binary (e.g., may indicate that a given antenna panel 310 supports a fixed set of beam weights or an arbitrary set of beam weights). Alternatively, the control signaling may indicate additional capability information associated with the beamforming architectures and beamforming configurations of the UE 115-*b*. For instance, the control signaling may implicitly or explicitly indicate beamforming capabilities of the antenna panels 310, such as a quantity of supported beam weights. In some cases, the control signaling may include a capability field.

FIG. 3B illustrates an example of antenna panels 310 at the UE 115-*c*, where each antenna panel 310 includes subarrays 320. In the example of FIG. 3B, the antenna panel 310-*d* and the antenna panel 310-*e* may be associated with a set of beamforming configurations, where each antenna panel 310 may be associated with multiple beamforming configurations (e.g., multiple beamforming architectures). That is, a subarray 320-*a* may be associated with a first beamforming configuration and a subarray 320-*b* may be associated with a second beamforming configuration different from the first beamforming configuration, such that the antenna panel 310-*d* may support beamforming using mixed beamforming architectures. Likewise, a subarray 320-*c* may be associated with the first beamforming configuration and the subarray 320-*d* may be associated with the second beamforming configuration.

As an example, the subarrays 320-*a* and 320-*c* may be associated with a Butler matrix architecture, while the subarrays 320-*b* and 320-*d* may be associated with a vector sum modulator architecture. As described with reference to FIG. 3A, the UE 115-*b* may select antenna elements 315 (from a set of antenna modules in some examples) from one or more of the antenna panels 310 and/or the subarrays 320 based on the corresponding beamforming configurations. The UE 115-*b* may generate a set of beam weights based on the selected antenna elements 315 to use in transmitting a wireless communication. The UE 115-*c* may transmit control signaling indicating the set of beamforming configurations to indicate a beamforming capability of the UE 115-*c*. In some cases, the control signaling may include an indication of beamforming properties, number of beam weights, threshold number of beam weights, resource differential(s), or the like, associated with the antenna panels 310 and/or the subarrays 320. That is, the UE 115-*c* may transmit control signaling including the indication for respective antenna panels 310, subarrays 320, or combinations of antenna panels 310 and subarrays 320.

For example, the UE 115-*c* may indicate, via control signaling, that the antenna panel 310-*d* and the antenna panel 310-*e* support both fixed beam weights and arbitrary beam weights. Additionally or alternatively, the UE 115-*c* may indicate that the subarray 320-*a* supports fixed beam weights, while the subarray 320-*b* supports arbitrary beam weights. The indication may be binary and may indicate that a given subarray 320 supports a fixed set of beam weights or an arbitrary set of beam weights. Alternatively, the control signaling may indicate additional capability information associated with the beamforming architectures and beamforming configurations of the UE 115-*c*. For instance, the control signaling may implicitly or explicitly indicate beamforming capabilities of the antenna panels 310 or the subarrays 320, such as a quantity of supported beam weights. In some cases, the control signaling may include a capability field.

Figure 4:
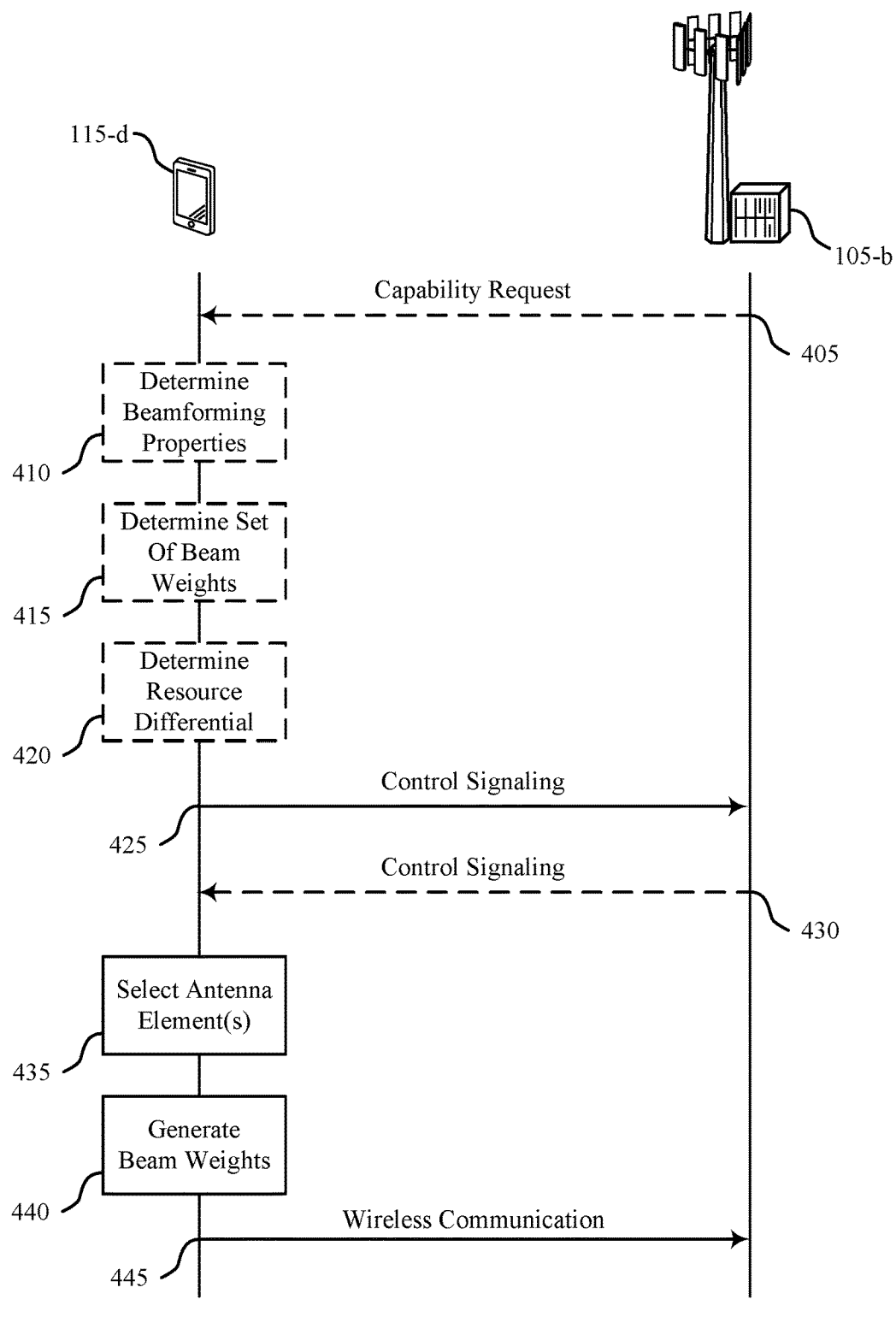
FIG. 4 illustrates an example of a process flow that supports a heterogenous beamforming capability with a mixed beamforming architecture in accordance with aspects of the present disclosure.

FIG. 4 illustrates an example of a process flow 400 that supports heterogenous beamforming capability with a mixed beamforming architecture in accordance with aspects of the present disclosure. In some examples, the process flow 400 may implement or be implemented by aspects of the wireless communications system 100 or 200. For example, the process flow 400 may correspond to communications between a base station 105-*b* and a UE 115-*d*, which may be examples of a base station 105 and a UE 115 as described with reference to FIGS. 1 and 2. In the following description of the process flow 400, operations between the base station 105-*b* and the UE 115-*d* may occur in a different order or at different times than as shown. Some operations may also be omitted from the process flow 400, and other operations may be added to the process flow 400.

In the example of FIG. 4, the base station 105-*b* and the UE 115-*d* may support beamformed communication as described herein. For example, the UE 115-*d* may include a set of antenna panels, each antenna panel including one or more antenna elements. Each antenna panel may be associated with one or more beamforming configurations of a set of beamforming configurations, which may be the same or different across the set of antenna panels. For example, a first beamforming configuration associated with a first antenna panel of the set of antenna panels may be different than a second beamforming configuration associated with a second antenna panel of the set of antenna panels. The set of beamforming configurations may include a Butler matrix beamforming architecture, a vector sum modulator beamforming architecture, a lens array architecture, or a combination thereof, among other examples.

At 405, the base station 105-*b* may optionally transmit, and the UE 115-*d* may receive, a request for an indication of a beamforming capability at the UE 115-*d*. At 410, the UE 115-*d* may optionally determine or otherwise identify one or more beamforming properties associated with the set of beamforming configurations. For instance, the UE 115-*d* may identify a set of beamforming properties associated with the set of beamforming configurations. Additionally or alternatively, the UE 115-*d* may identify a first beamforming property associated with a first subset of antenna elements of an antenna panel of the set of antenna panels, a second beamforming property associated with a second subset of antenna elements of the antenna panel, and so forth. In some cases, the first beamforming property may be different than the second beamforming property.

At 415, the UE 115-*d* may determine a set of beam weights associated with each beamforming configuration of the set of beamforming configurations. Here, the UE 115-*d* may determine a number of beam weights associated with each beamforming configuration, a threshold number of a set of beam weights associated with each beamforming configuration, or a combination thereof. At 420, the UE 115-*d* may determine one or more resource differentials associated with each beamforming configuration of the set of beamforming configurations. For instance, the UE 115-*d* may determine a power differential, a thermal overhead differential, or a combination thereof, associated with each beamforming configuration.

At 425, the UE 115-*d* may transmit, and the base station 105-*b* may receive, control signaling indicating a set of beamforming configurations associated with a set of panels at the UE 115-*d*. In some cases, the UE 115-*d* may transmit the control signaling based on the request received at 405. The control signaling may indicate the beamforming capability at the UE 115-*d*. In some examples, the control signaling may additionally indicate the set of beamforming properties associated with each beamforming configuration (e.g., as determined at 410), the number of beam weights associated with each beamforming configuration (e.g. as determined at 415), the threshold number of the set of beam weights associated with each beamforming configuration (e.g., as determined at 415), the resource differential associated with each beamforming configuration (e.g., as determined at 420), or a combination thereof.

At 430, the base station 105-*b* may optionally transmit, and the UE 115-*d* may optionally receive, second control signaling that indicates a beamforming configuration of the set of beamforming configurations. In some examples, the base station 105-*b* may indicate the beamforming configuration based on the beamforming capability of the UE 115-*d*, for example, indicated at 425. At 435, the UE 115-*d* may select one or more antenna elements of at least one antenna panel of the set of antenna panels for wireless communication based on a beamforming configuration of the set of beamforming configurations and associated with the at least one antenna panel. For instance, the beamforming configuration may be the beamforming configuration indicated by the base station 105-*b* at 430.

Additionally, at 435, the UE 115-*d* may select the one or more antenna elements based on the set of beamforming properties (e.g., as determined at 410), the threshold number of the set of beam weights (e.g., as determined at 415), the resource differential (e.g., as determined at 420), or a combination thereof. At 440, the UE 115-*d* may generate a set of beam weights for the wireless communication based on the beamforming configuration and the one or more selected antenna elements. At 445, the UE 115-*d* may transmit, and the base station 105-*b* may receive, the wireless communication using the generated set of beam weights.

By implementing the signaling of beamforming capabilities related to various beamforming architectures, the UE 115-*d* may promote high reliability and low latency wireless communication. The UE 115-*d* may also manage resource utilization by implementing signaling beamforming capabilities related to various beamforming architectures. Additionally or alternatively, by implementing signaling beamforming capabilities related to various beamforming architectures, the UE 115-*d* may experience reduced power consumption.

Figure 5:
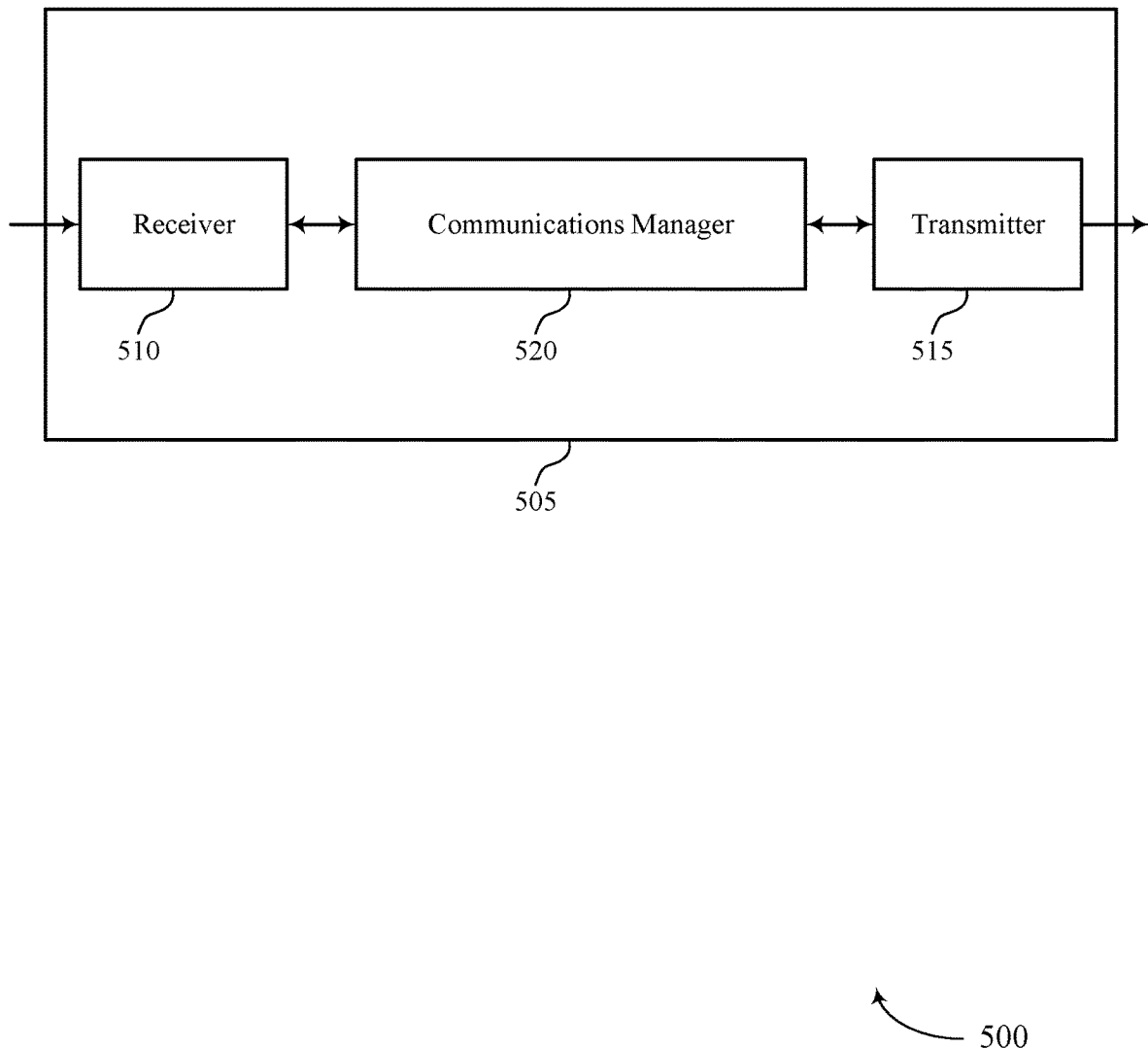
FIGS. 5 and 6 show block diagrams of devices that support a heterogenous beamforming capability with a mixed beamforming architecture in accordance with aspects of the present disclosure.

FIG. 5 shows a block diagram 500 of a device 505 that supports heterogenous beamforming capability with a mixed beamforming architecture in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to heterogenous beamforming capability with a mixed beamforming architecture). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to heterogenous beamforming capability with a mixed beamforming architecture). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of heterogenous beamforming capability with a mixed beamforming architecture as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at the device 505 (e.g., a UE) in accordance with examples as disclosed herein. For example, the communications manager 520 may be configured as or otherwise support a means for transmitting control signaling indicating a set of beamforming configurations associated with a set of antenna panels at the device 505. The communications manager 520 may be configured as or otherwise support a means for selecting one or more antenna elements of at least one antenna panel of the set of antenna panels for wireless communication based on a beamforming configuration of the set of beamforming configurations and associated with the at least one antenna panel. The communications manager 520 may be configured as or otherwise support a means for generating a set of beam weights for the wireless communication based on the beamforming configuration and the one or more selected antenna elements of the at least one antenna panel. The communications manager 520 may be configured as or otherwise support a means for transmitting the wireless communication using the generated set of beam weights.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for dynamically adapting beamforming communications based on beamforming capabilities at the device 505. The device 505 may dynamically select antenna elements for communications based on associated beamforming configurations. For instance, the device 505 may select antenna elements based on supported beamforming properties, power tradeoffs, thermal tradeoffs, or the like, which may reduce power consumption at the device 505 and provide more efficient utilization of communication resources. Additionally, the device 505 may exchange signaling with one or more other devices to indicate supported beamforming configuration, which may provide improved coordination between devices.

Figure 6:
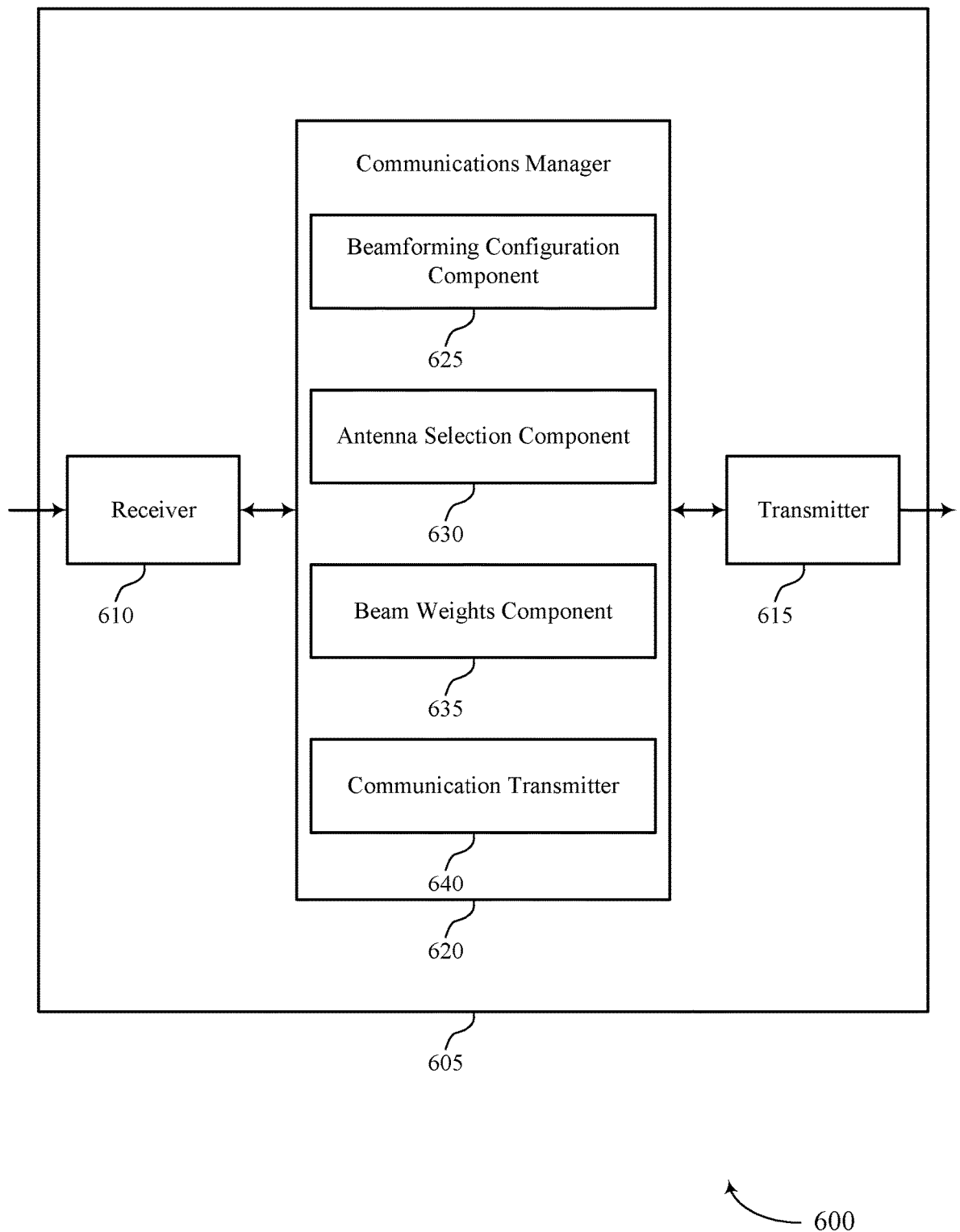

FIG. 6 shows a block diagram 600 of a device 605 that supports heterogenous beamforming capability with a mixed beamforming architecture in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to heterogenous beamforming capability with a mixed beamforming architecture). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to heterogenous beamforming capability with a mixed beamforming architecture). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of heterogenous beamforming capability with a mixed beamforming architecture as described herein. For example, the communications manager 620 may include a beamforming configuration component 625, an antenna selection component 630, a beam weights component 635, a communication transmitter 640, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at the device 605 (e.g., a UE) in accordance with examples as disclosed herein. The beamforming configuration component 625 may be configured as or otherwise support a means for transmitting control signaling indicating a set of beamforming configurations associated with a set of antenna panels at the device 605. The antenna selection component 630 may be configured as or otherwise support a means for selecting one or more antenna elements of at least one antenna panel of the set of antenna panels for wireless communication based on a beamforming configuration of the set of beamforming configurations and associated with the at least one antenna panel. The beam weights component 635 may be configured as or otherwise support a means for generating a set of beam weights for the wireless communication based on the beamforming configuration and the one or more selected antenna elements of the at least one antenna panel. The communication transmitter 640 may be configured as or otherwise support a means for transmitting the wireless communication using the generated set of beam weights.

Figure 7:
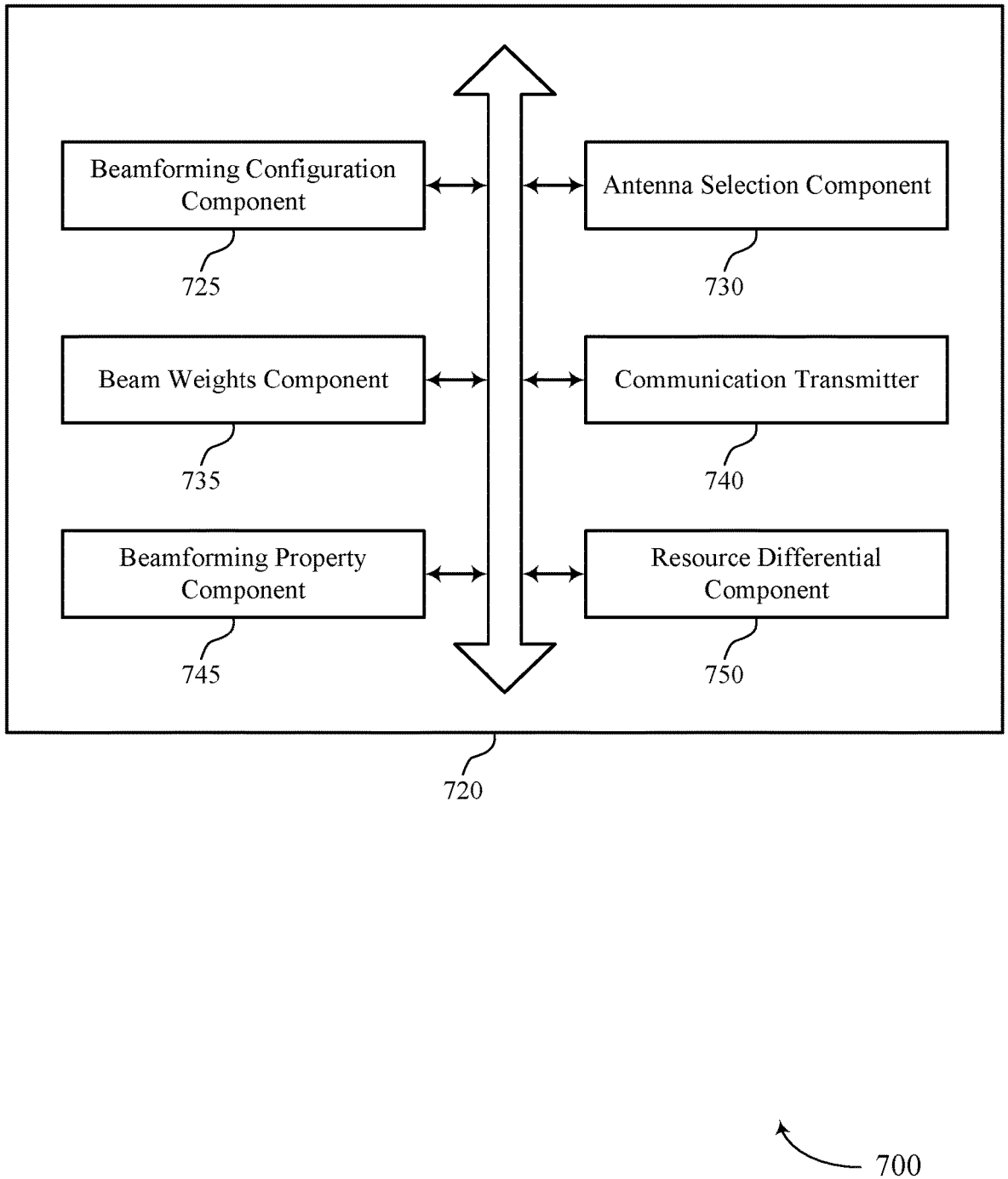
FIG. 7 shows a block diagram of a communications manager that supports a heterogenous beamforming capability with a mixed beamforming architecture in accordance with aspects of the present disclosure.

FIG. 7 shows a block diagram 700 of a communications manager 720 that supports heterogenous beamforming capability with a mixed beamforming architecture in accordance with aspects of the present disclosure. The communications manager 720 may be an example of aspects of a communications manager 520, a communications manager 620, or both, as described herein. The communications manager 720, or various components thereof, may be an example of means for performing various aspects of heterogenous beamforming capability with a mixed beamforming architecture as described herein. For example, the communications manager 720 may include a beamforming configuration component 725, an antenna selection component 730, a beam weights component 735, a communication transmitter 740, a beamforming property component 745, a resource differential component 750, or any combination thereof. Each of these components may communicate, directly or indirectly, with one another (e.g., via one or more buses).

The communications manager 720 may support wireless communications at a UE in accordance with examples as disclosed herein. The beamforming configuration component 725 may be configured as or otherwise support a means for transmitting control signaling indicating a set of beamforming configurations associated with a set of antenna panels at the UE. The antenna selection component 730 may be configured as or otherwise support a means for selecting one or more antenna elements of at least one antenna panel of the set of antenna panels for wireless communication based on a beamforming configuration of the set of beamforming configurations and associated with the at least one antenna panel. The beam weights component 735 may be configured as or otherwise support a means for generating a set of beam weights for the wireless communication based on the beamforming configuration and the one or more selected antenna elements of the at least one antenna panel. The communication transmitter 740 may be configured as or otherwise support a means for transmitting the wireless communication using the generated set of beam weights.

In some examples, the beamforming property component 745 may be configured as or otherwise support a means for determining a set of beamforming properties associated with the set of beamforming configurations, the control signaling further indicating the set of beamforming properties associated with the set of beamforming configurations. In some examples, selecting the one or more antenna elements of the at least one antenna panel of the set of antenna panels for the wireless communication is further based on the set of beamforming properties. In some examples, a first beamforming configuration associated with a first antenna panel of the set of antenna panels is different than a second beamforming configuration associated with a second antenna panel of the set of antenna panels. In some examples, a first beamforming property associated with a first subset of antenna elements of the at least one antenna panel is different than a second beamforming property associated with a second subset of antenna elements of the at least one antenna panel.

In some examples, the beam weights component 735 may be configured as or otherwise support a means for determining a threshold number of the set of beam weights associated with each beamforming configuration of the set of beamforming configurations, the control signaling further indicating the threshold number of the set of beam weights associated with each beamforming configuration of the set of beamforming configurations. In some examples, selecting the one or more antenna elements of the at least one antenna panel of the set of antenna panels for the wireless communication is further based on the threshold number of the set of beam weights.

In some examples, the beam weights component 735 may be configured as or otherwise support a means for determining a number of beam weights associated with each beamforming configuration of the set of beamforming configurations, the control signaling further indicating the number of beam weights associated with each beamforming configuration of the set of beamforming configurations. In some examples, selecting the one or more antenna elements of the at least one antenna panel of the set of antenna panels for the wireless communication is further based on the number of beam weights. In some examples, the beamforming configuration component 725 may be configured as or otherwise support a means for receiving second control signaling indicating the beamforming configuration. In some examples, selecting the one or more antenna elements of the at least one antenna panel of the set of antenna panels for the wireless communication is further based on the received second control signaling.

In some examples, the resource differential component 750 may be configured as or otherwise support a means for determining a resource differential associated with each beamforming configuration of the set of beamforming configurations, the control signaling indicating the resource differential associated with each beamforming configuration of the set of beamforming configurations. In some examples, selecting the one or more antenna elements of the at least one antenna panel of the set of antenna panels for the wireless communication is further based on the resource differential. In some examples, the resource differential includes one or both of a power differential associated with each beamforming configuration of the set of beamforming configurations or a thermal overhead differential associated with each beamforming configuration of the set of beamforming configurations.

In some examples, the beamforming configuration component 725 may be configured as or otherwise support a means for receiving a request for an indication of a beamforming capability at the UE. In some examples, transmitting the control signaling indicating the set of beamforming configurations associated with the set of antenna panels at the UE is further based on the request for the indication of the beamforming capability at the UE. In some examples, the set of beamforming configurations includes one or both of a Butler matrix beamforming architecture or a vector sum modulator beamforming architecture or a lens array architecture.

Figure 8:
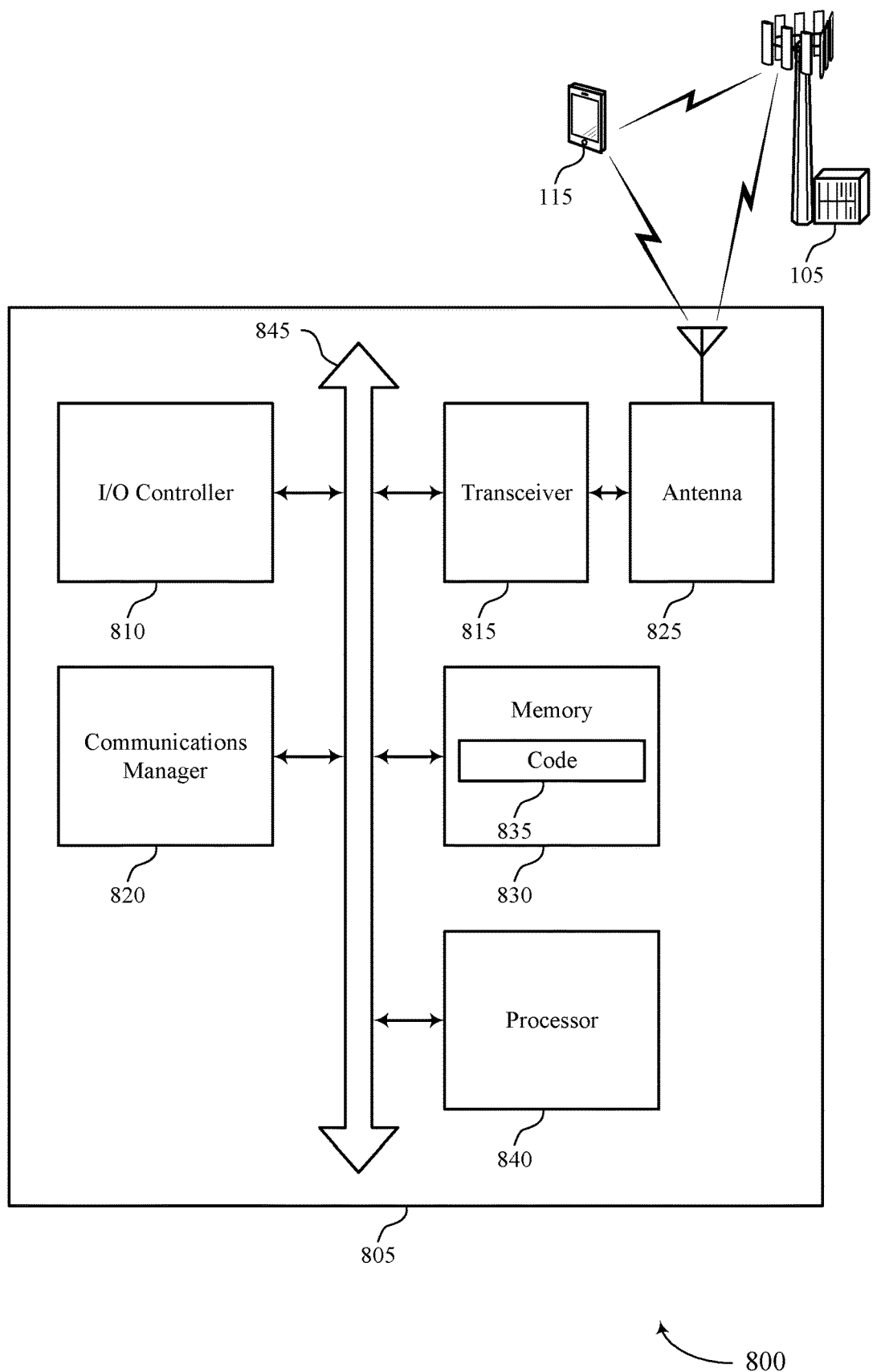
FIG. 8 shows a diagram of a system including a device that supports a heterogenous beamforming capability with a mixed beamforming architecture in accordance with aspects of the present disclosure.

FIG. 8 shows a diagram of a system 800 including a device 805 that supports heterogenous beamforming capability with a mixed beamforming architecture in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting heterogenous beamforming capability with a mixed beamforming architecture). For example, the device 805 or a component of the device 805 may include a processor 840 and memory 830 coupled to the processor 840, the processor 840 and memory 830 configured to perform various functions described herein.

The communications manager 820 may support wireless communications at the device 805 (e.g., a UE) in accordance with examples as disclosed herein. For example, the communications manager 820 may be configured as or otherwise support a means for transmitting control signaling indicating a set of beamforming configurations associated with a set of antenna panels at the device 805. The communications manager 820 may be configured as or otherwise support a means for selecting one or more antenna elements of at least one antenna panel of the set of antenna panels for wireless communication based on a beamforming configuration of the set of beamforming configurations and associated with the at least one antenna panel. The communications manager 820 may be configured as or otherwise support a means for generating a set of beam weights for the wireless communication based on the beamforming configuration and the one or more selected antenna elements of the at least one antenna panel. The communications manager 820 may be configured as or otherwise support a means for transmitting the wireless communication using the generated set of beam weights.

By including or configuring the communications manager 820 in accordance with examples as described herein, the device 805 may support techniques for dynamically adapting beamforming communications based on beamforming capabilities at the device 805. The device 805 may dynamically select antenna elements for communications based on associated beamforming configurations. For instance, the device 805 may select antenna elements based on supported beamforming properties, power tradeoffs, thermal tradeoffs, or the like, which may improve gain and reliability in wireless communications. The device 805 may exchange signaling with one or more other devices to indicate supported beamforming configurations, which may provide for increased communications efficiency and improved coordination between devices.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of heterogenous beamforming capability with a mixed beamforming architecture as described herein, or the processor 840 and the memory 830 may be otherwise configured to perform or support such operations.

Figure 9:
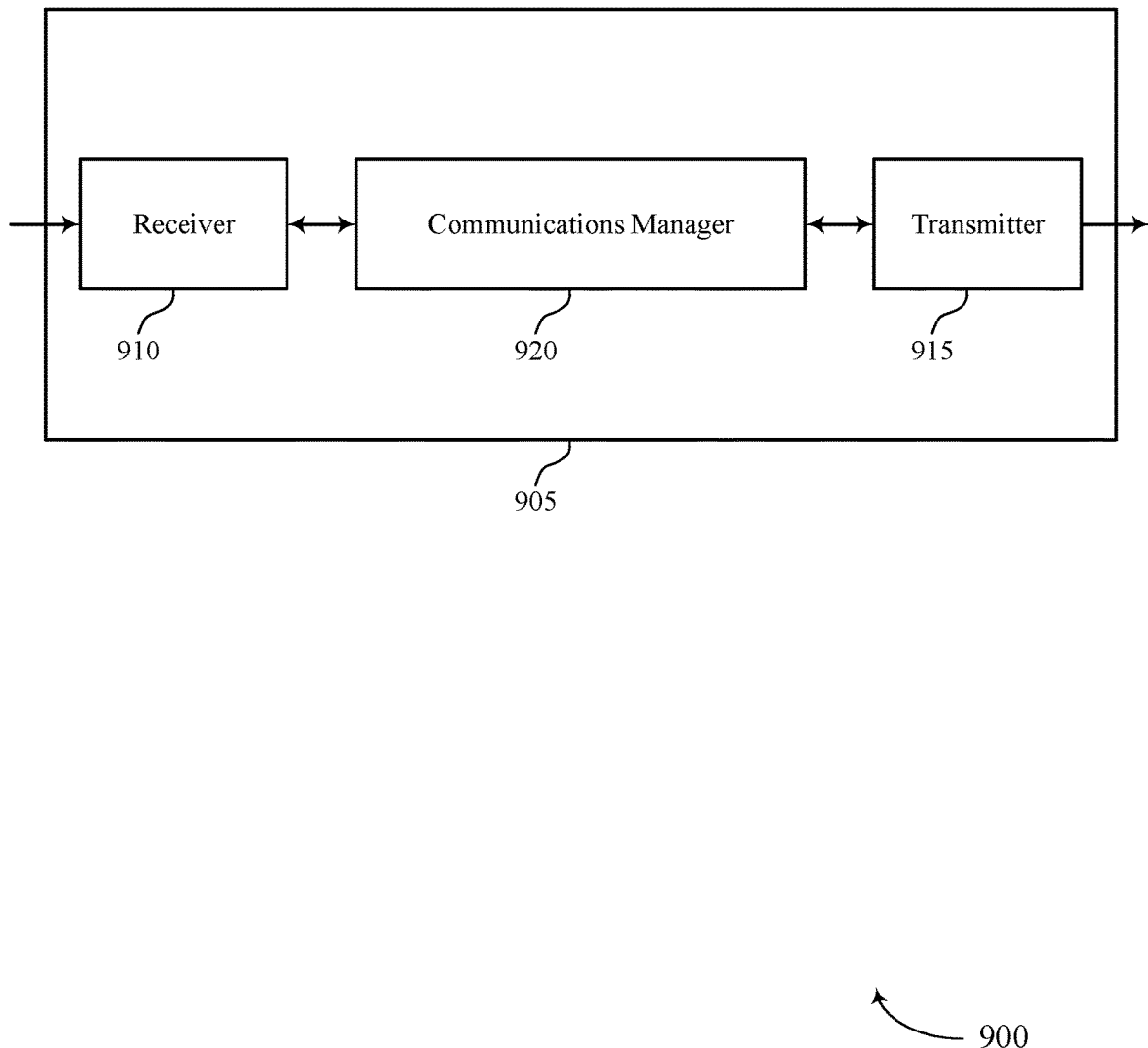
FIGS. 9 and 10 show block diagrams of devices that support a heterogenous beamforming capability with a mixed beamforming architecture in accordance with aspects of the present disclosure.

FIG. 9 shows a block diagram 900 of a device 905 that supports heterogenous beamforming capability with a mixed beamforming architecture in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to heterogenous beamforming capability with a mixed beamforming architecture). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to heterogenous beamforming capability with a mixed beamforming architecture). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of heterogenous beamforming capability with a mixed beamforming architecture as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at the device 905 (e.g., a base station) in accordance with examples as disclosed herein. For example, the communications manager 920 may be configured as or otherwise support a means for receiving control signaling indicating a set of beamforming configurations associated with a set of antenna panels at a UE. The communications manager 920 may be configured as or otherwise support a means for receiving wireless communication according to a generated set of beam weights, the generated set of beam weights based on a beamforming configuration of the set of beamforming configurations and associated with at least one antenna panel of the set of antenna panels.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for dynamically adapting beamforming communications based on beamforming capabilities. The device 905 may exchange signaling with one or more other devices to indicate supported beamforming configurations, which may provide for improved coordination between devices. For instance, the device 905 may receive signaling from a UE that indicates a beamforming capability of the UE. The device 905 may adjust communications parameters based on the beamforming capability, thereby increasing reliability and efficiency in communications with the UE.

Figure 10:
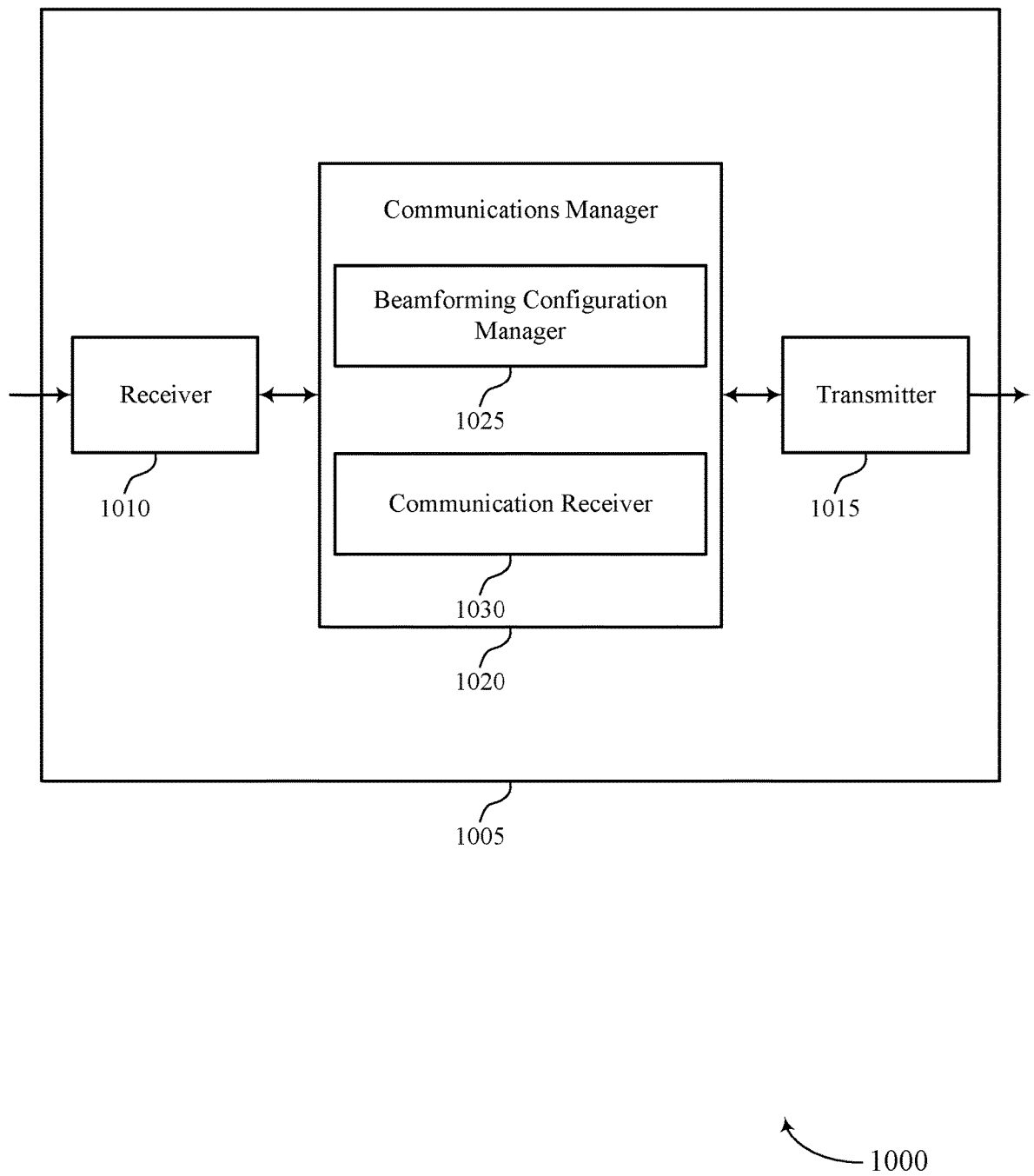

FIG. 10 shows a block diagram 1000 of a device 1005 that supports heterogenous beamforming capability with a mixed beamforming architecture in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to heterogenous beamforming capability with a mixed beamforming architecture). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to heterogenous beamforming capability with a mixed beamforming architecture). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of heterogenous beamforming capability with a mixed beamforming architecture as described herein. For example, the communications manager 1020 may include a beamforming configuration manager 1025 a communication receiver 1030, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at the device 1005 (e.g., a base station) in accordance with examples as disclosed herein. The beamforming configuration manager 1025 may be configured as or otherwise support a means for receiving control signaling indicating a set of beamforming configurations associated with a set of antenna panels at a UE. The communication receiver 1030 may be configured as or otherwise support a means for receiving wireless communication according to a generated set of beam weights, the generated set of beam weights based on a beamforming configuration of the set of beamforming configurations and associated with at least one antenna panel of the set of antenna panels.

Figure 11:
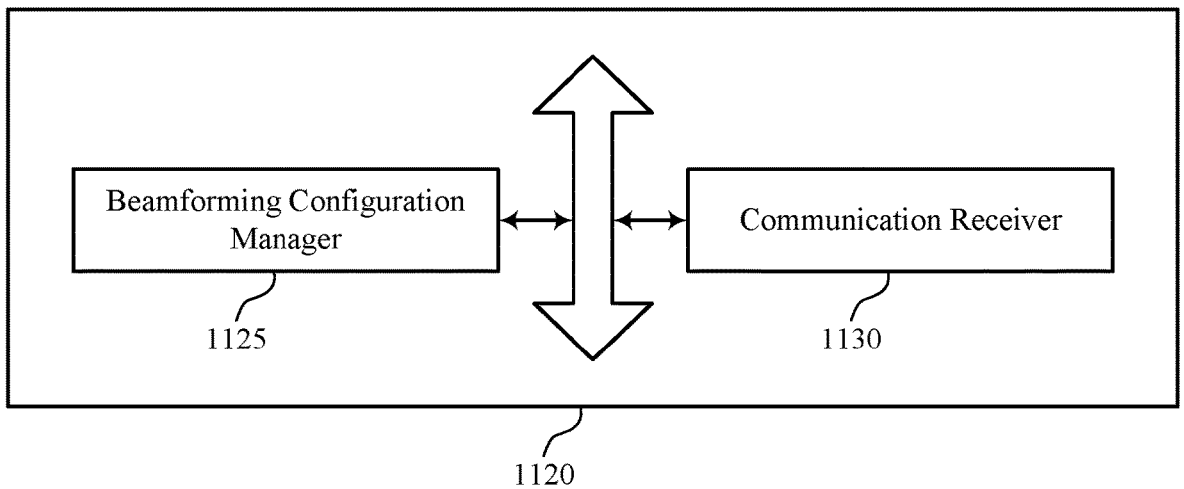
FIG. 11 shows a block diagram of a communications manager that supports a heterogenous beamforming capability with a mixed beamforming architecture in accordance with aspects of the present disclosure.

FIG. 11 shows a block diagram 1100 of a communications manager 1120 that supports heterogenous beamforming capability with a mixed beamforming architecture in accordance with aspects of the present disclosure. The communications manager 1120 may be an example of aspects of a communications manager 920, a communications manager 1020, or both, as described herein. The communications manager 1120, or various components thereof, may be an example of means for performing various aspects of heterogenous beamforming capability with a mixed beamforming architecture as described herein. For example, the communications manager 1120 may include a beamforming configuration manager 1125 a communication receiver 1130, or any combination thereof. Each of these components may communicate, directly or indirectly, with one another (e.g., via one or more buses).

The communications manager 1120 may support wireless communications at a base station in accordance with examples as disclosed herein. The beamforming configuration manager 1125 may be configured as or otherwise support a means for receiving control signaling indicating a set of beamforming configurations associated with a set of antenna panels at a UE. The communication receiver 1130 may be configured as or otherwise support a means for receiving wireless communication according to a generated set of beam weights, the generated set of beam weights based on a beamforming configuration of the set of beamforming configurations and associated with at least one antenna panel of the set of antenna panels.

In some examples, the control signaling further indicates a set of beamforming properties associated with the set of beamforming configurations. In some examples, the control signaling further indicates a threshold number of the set of beam weights associated with each beamforming configuration of the set of beamforming configurations. In some examples, the control signaling further indicates a number of beam weights associated with each beamforming configuration of the set of beamforming configurations. In some examples, the beamforming configuration manager 1125 may be configured as or otherwise support a means for transmitting second control signaling indicating the beamforming configuration. In some examples, receiving the wireless communication according to the generated set of beam weights is based on transmitting the second control signaling.

In some examples, the control signaling further indicates a resource differential associated with each beamforming configuration of the set of beamforming configurations. In some examples, the resource differential includes one or both of a power differential associated with each beamforming configuration of the set of beamforming configurations or a thermal overhead differential associated with each beamforming configuration of the set of beamforming configurations.

In some examples, the beamforming configuration manager 1125 may be configured as or otherwise support a means for transmitting a request for an indication of a beamforming capability at the UE. In some examples, receiving the control signaling indicating the set of beamforming configurations associated with the set of antenna panels at the UE is further based on the request for the indication of the beamforming capability at the UE. In some examples, the set of beamforming configurations includes a Butler matrix beamforming architecture, a vector sum modulator beamforming architecture, or a lens array architecture, or a combination thereof.

Figure 12:
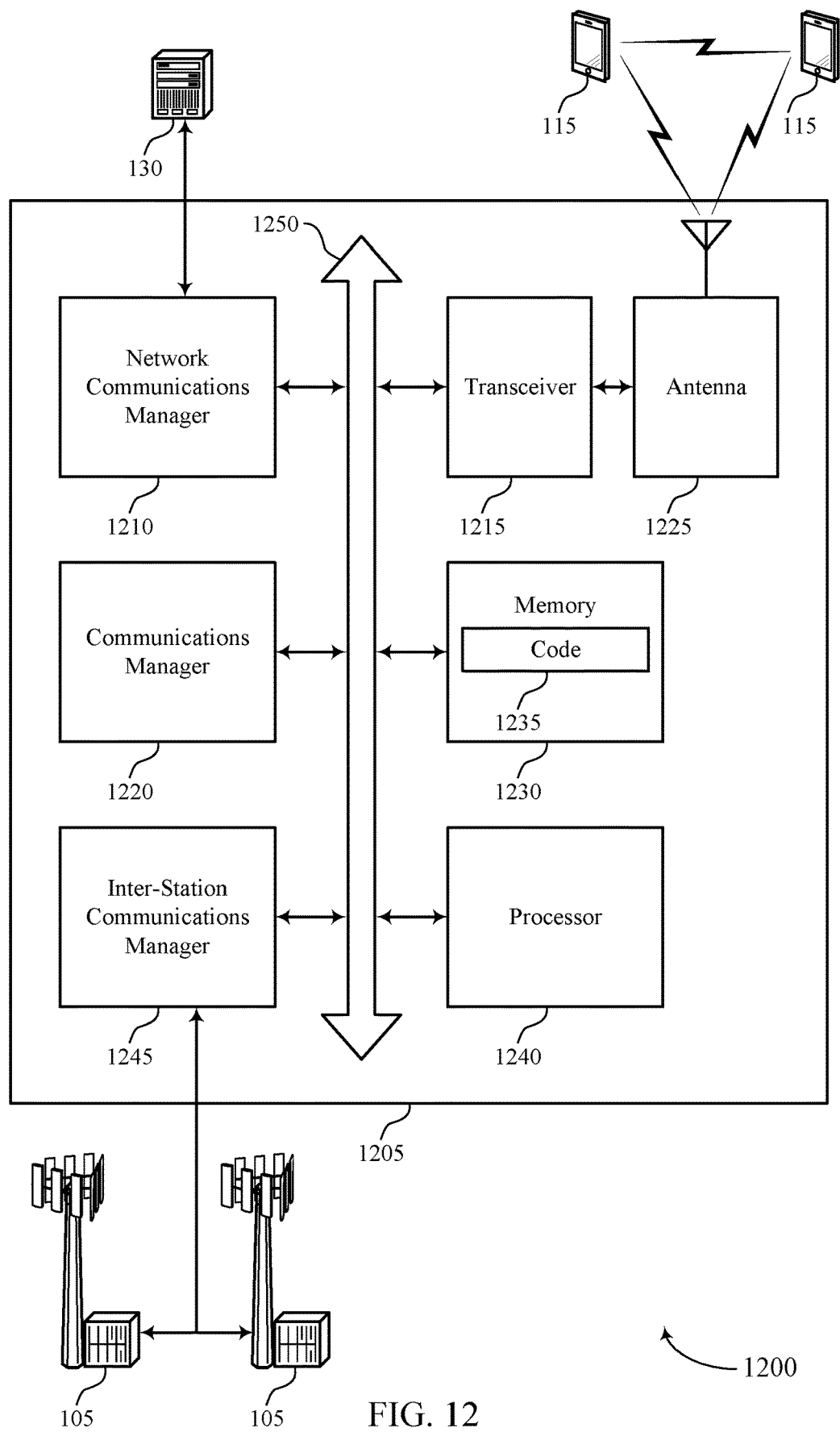
FIG. 12 shows a diagram of a system including a device that supports a heterogenous beamforming capability with a mixed beamforming architecture in accordance with aspects of the present disclosure.

FIG. 12 shows a diagram of a system 1200 including a device 1205 that supports heterogenous beamforming capability with a mixed beamforming architecture in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting heterogenous beamforming capability with a mixed beamforming architecture). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communications at the device 1205 (e.g., a base station) in accordance with examples as disclosed herein. For example, the communications manager 1220 may be configured as or otherwise support a means for receiving control signaling indicating a set of beamforming configurations associated with a set of antenna panels at a UE. The communications manager 1220 may be configured as or otherwise support a means for receiving wireless communication according to a generated set of beam weights, the generated set of beam weights based on a beamforming configuration of the set of beamforming configurations and associated with at least one antenna panel of the set of antenna panels.

By including or configuring the communications manager 1220 in accordance with examples as described herein, the device 1205 may support techniques for dynamically adapting beamforming communications based on beamforming capabilities. The device 1205 may exchange signaling with one or more other devices to indicate supported beamforming configurations, which may provide for improved coordination between devices. For instance, the device 1205 may receive signaling from a UE that indicates a beamforming capability of the UE. The device 1205 may adjust communications parameters based on the beamforming capability, thereby increasing reliability and efficiency in communications with the UE.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of heterogenous beamforming capability with a mixed beamforming architecture as described herein, or the processor 1240 and the memory 1230 may be otherwise configured to perform or support such operations.

Figure 13:
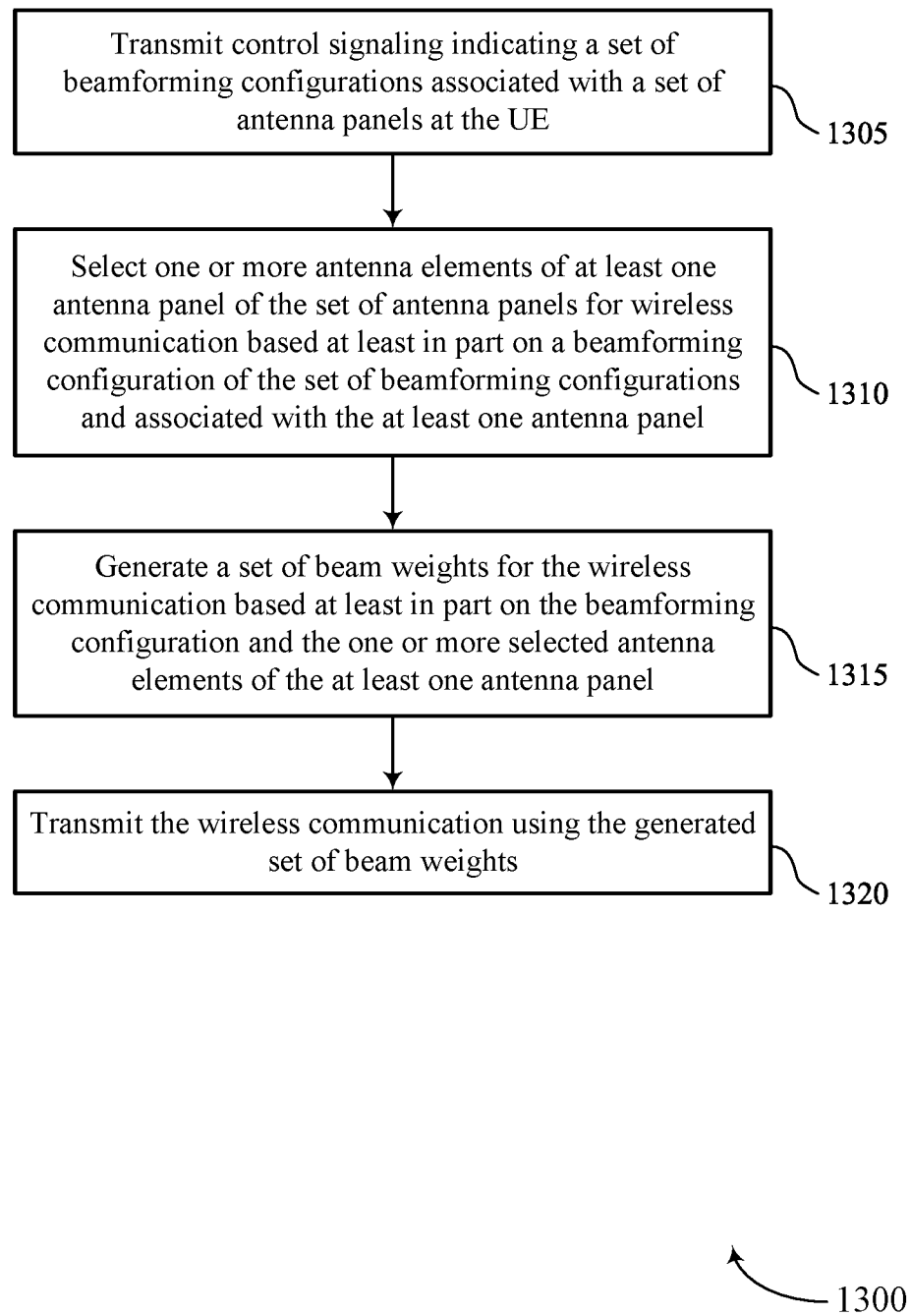
FIGS. 13 through 16 show flowcharts illustrating methods that support a heterogenous beamforming capability with a mixed beamforming architecture in accordance with aspects of the present disclosure.

FIG. 13 shows a flowchart illustrating a method 1300 that supports heterogenous beamforming capability with a mixed beamforming architecture in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, a UE may perform aspects of the described functions using special-purpose hardware.

At 1305, the method may include transmitting control signaling indicating a set of beamforming configurations associated with a set of antenna panels at the UE. The operations of 1305 may be performed in accordance with examples as disclosed herein. In some examples, aspects of the operations of 1305 may be performed by a beamforming configuration component 725 as described with reference to FIG. 7.

At 1310, the method may include selecting one or more antenna elements of at least one antenna panel of the set of antenna panels for wireless communication based on a beamforming configuration of the set of beamforming configurations and associated with the at least one antenna panel. The operations of 1310 may be performed in accordance with examples as disclosed herein. In some examples, aspects of the operations of 1310 may be performed by an antenna selection component 730 as described with reference to FIG. 7.

At 1315, the method may include generating a set of beam weights for the wireless communication based on the beamforming configuration and the one or more selected antenna elements of the at least one antenna panel. The operations of 1315 may be performed in accordance with examples as disclosed herein. In some examples, aspects of the operations of 1315 may be performed by a beam weights component 735 as described with reference to FIG. 7.

At 1320, the method may include transmitting the wireless communication using the generated set of beam weights. The operations of 1320 may be performed in accordance with examples as disclosed herein. In some examples, aspects of the operations of 1320 may be performed by a communication transmitter 740 as described with reference to FIG. 7.

Figure 14:
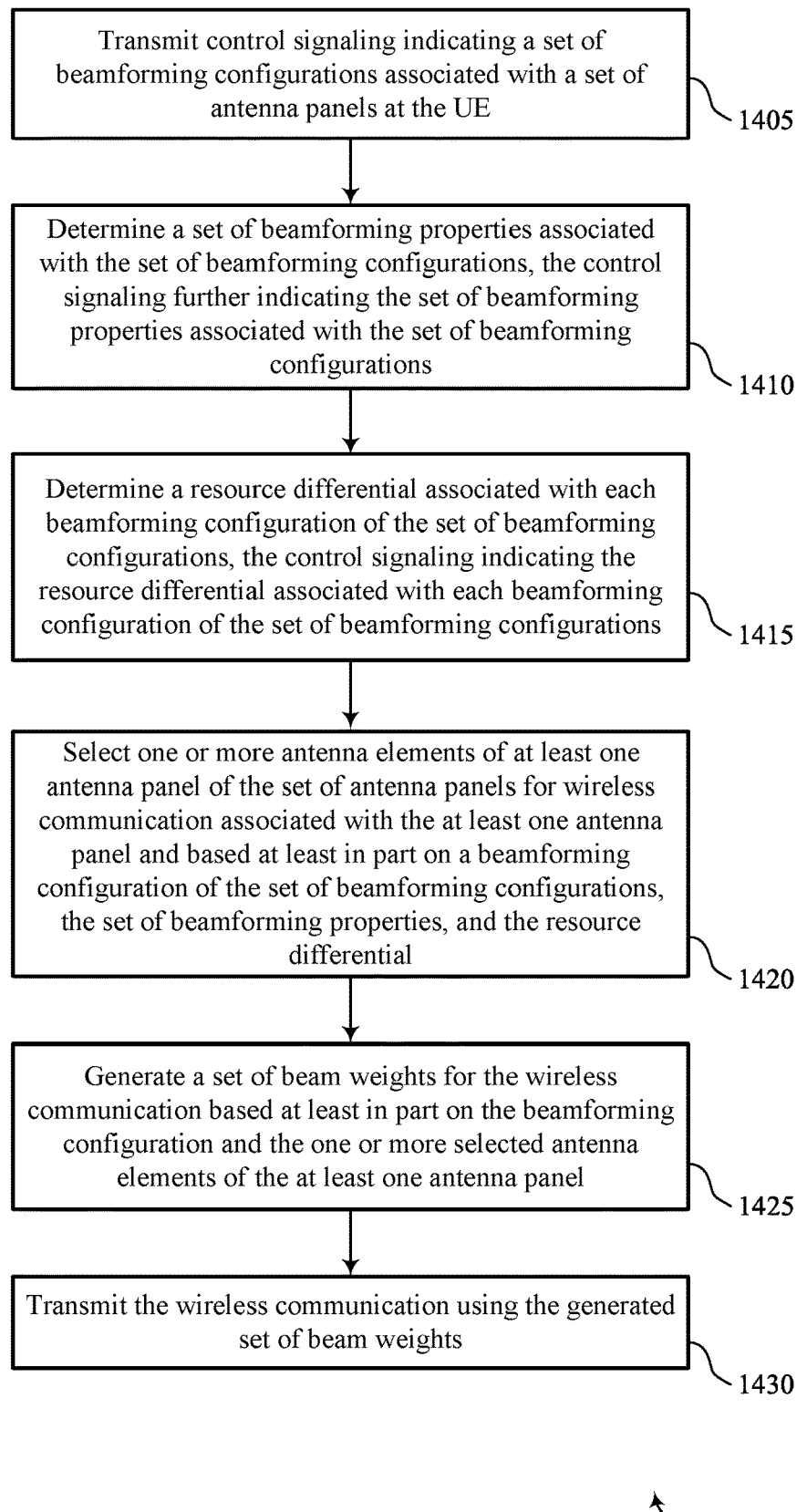

FIG. 14 shows a flowchart illustrating a method 1400 that supports heterogenous beamforming capability with a mixed beamforming architecture in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, a UE may perform aspects of the described functions using special-purpose hardware.

At 1405, the method may include transmitting control signaling indicating a set of beamforming configurations associated with a set of antenna panels at the UE. The operations of 1405 may be performed in accordance with examples as disclosed herein. In some examples, aspects of the operations of 1405 may be performed by a beamforming configuration component 725 as described with reference to FIG. 7.

At 1410, the method may include determining a set of beamforming properties associated with the set of beamforming configurations, the control signaling further indicating the set of beamforming properties associated with the set of beamforming configurations. The operations of 1410 may be performed in accordance with examples as disclosed herein. In some examples, aspects of the operations of 1410 may be performed by a beamforming property component 745 as described with reference to FIG. 7.

At 1415, the method may include determining a resource differential associated with each beamforming configuration of the set of beamforming configurations, the control signaling indicating the resource differential associated with each beamforming configuration of the set of beamforming configurations. The operations of 1415 may be performed in accordance with examples as disclosed herein. In some examples, aspects of the operations of 1415 may be performed by a resource differential component 750 as described with reference to FIG. 7.

At 1420, the method may include selecting one or more antenna elements of at least one antenna panel of the set of antenna panels for wireless communication associated with the at least one antenna panel and based at least in part on a beamforming configuration of the set of beamforming configurations, the set of beamforming properties, and the resource differential. The operations of 1420 may be performed in accordance with examples as disclosed herein. In some examples, aspects of the operations of 1420 may be performed by an antenna selection component 730 as described with reference to FIG. 7.

At 1425, the method may include generating a set of beam weights for the wireless communication based at least in part on the beamforming configuration and the one or more selected antenna elements of the at least one antenna panel. The operations of 1425 may be performed in accordance with examples as disclosed herein. In some examples, aspects of the operations of 1425 may be performed by a beam weights component 735 as described with reference to FIG. 7.

At 1430, the method may include transmitting the wireless communication using the generated set of beam weights. The operations of 1430 may be performed in accordance with examples as disclosed herein. In some examples, aspects of the operations of 1430 may be performed by a communication transmitter 740 as described with reference to FIG. 7.

Figure 15:
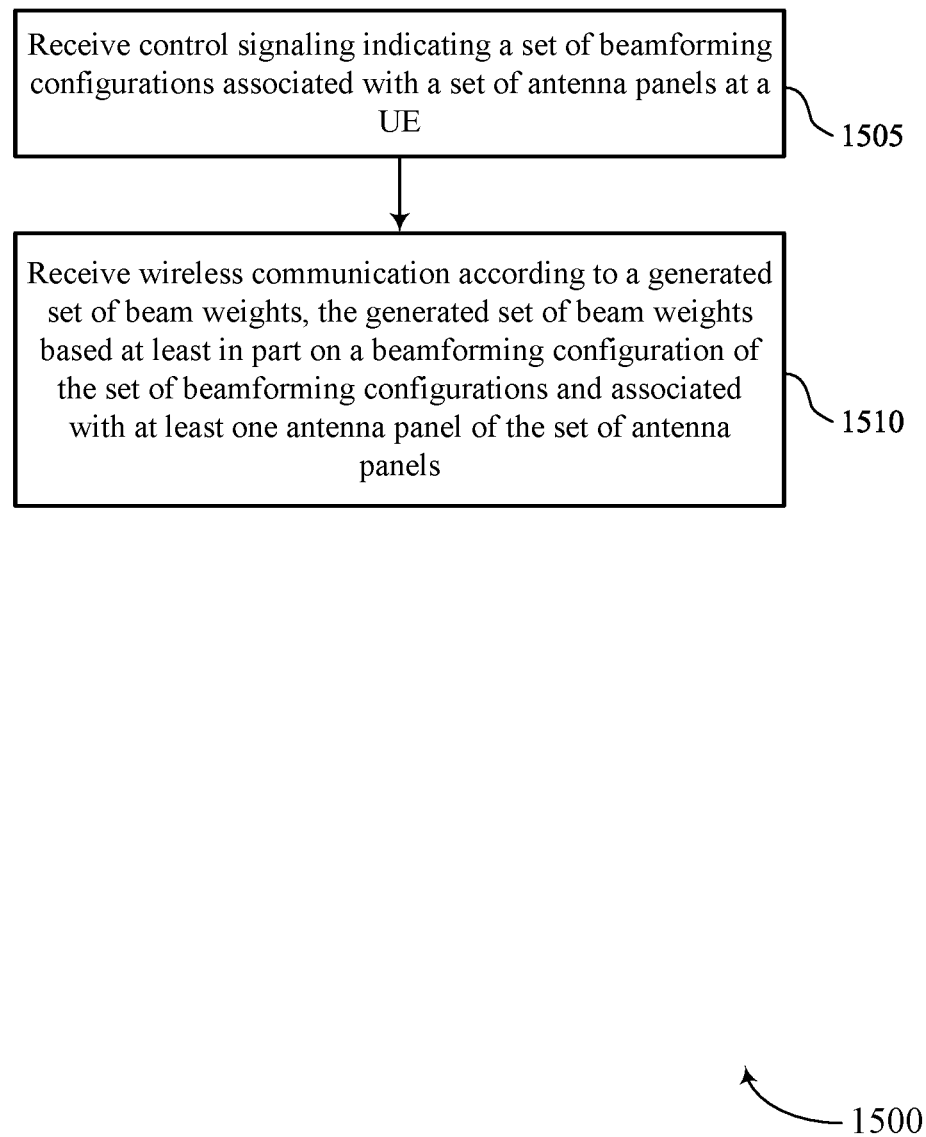

FIG. 15 shows a flowchart illustrating a method 1500 that supports heterogenous beamforming capability with a mixed beamforming architecture in accordance with aspects of the present disclosure. The operations of the method 1500 may be implemented by a base station or its components as described herein. For example, the operations of the method 1500 may be performed by a base station 105 as described with reference to FIGS. 1 through 4 and 9 through 12. In some examples, a base station may execute a set of instructions to control the functional elements of the base station to perform the described functions. Additionally or alternatively, a base station may perform aspects of the described functions using special-purpose hardware.

At 1505, the method may include receiving control signaling indicating a set of beamforming configurations associated with a set of antenna panels at a UE. The operations of 1505 may be performed in accordance with examples as disclosed herein. In some examples, aspects of the operations of 1505 may be performed by a beamforming configuration manager 1125 as described with reference to FIG. 11.

At 1510, the method may include receiving wireless communication according to a generated set of beam weights, the generated set of beam weights based at least in part on a beamforming configuration of the set of beamforming configurations and associated with at least one antenna panel of the set of antenna panels. The operations of 1510 may be performed in accordance with examples as disclosed herein. In some examples, aspects of the operations of 1510 may be performed by a communication receiver 1130 as described with reference to FIG. 11.

Figure 16:
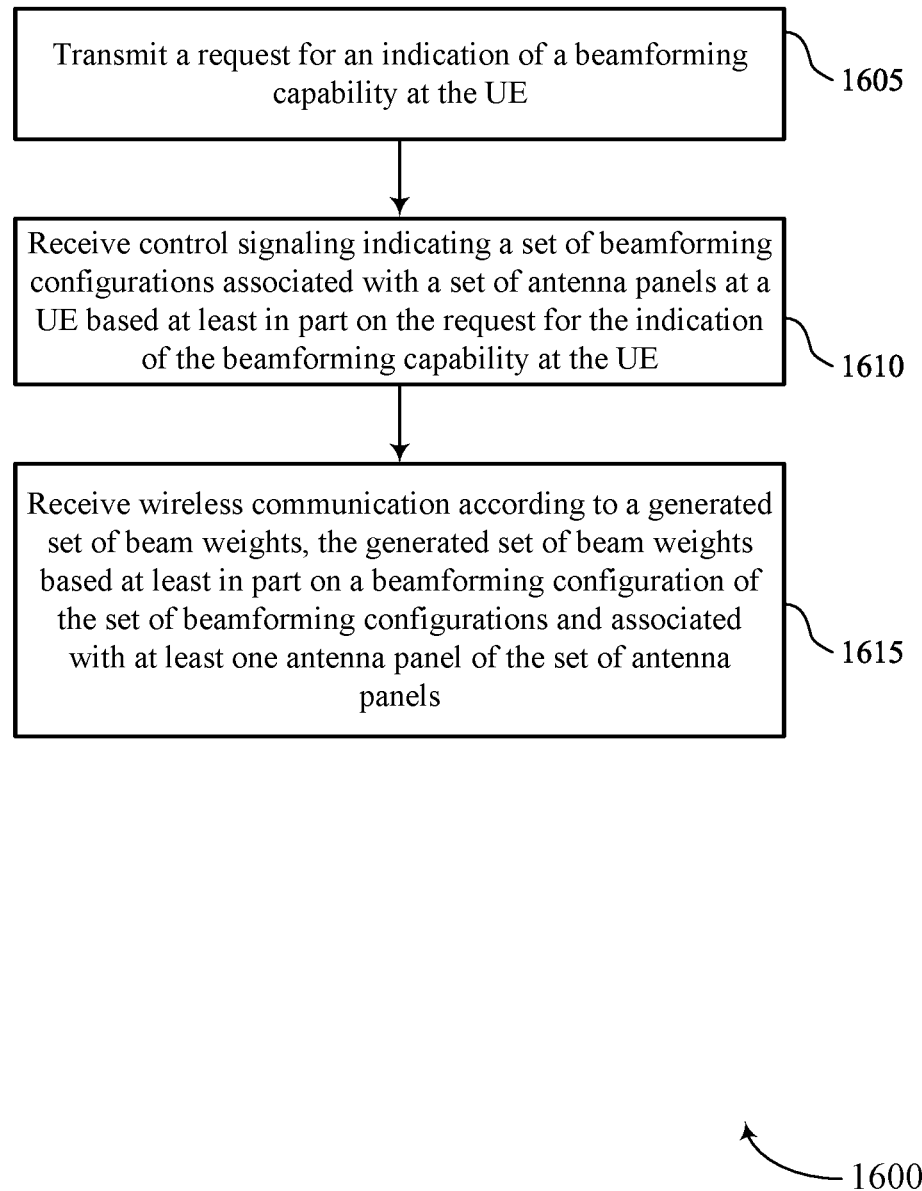

FIG. 16 shows a flowchart illustrating a method 1600 that supports heterogenous beamforming capability with a mixed beamforming architecture in accordance with aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally or alternatively, a base station may perform aspects of the described functions using special-purpose hardware.

At 1605, the method may include transmitting a request for an indication of a beamforming capability at the UE. The operations of 1605 may be performed in accordance with examples as disclosed herein. In some examples, aspects of the operations of 1605 may be performed by a beamforming configuration manager 1125 as described with reference to FIG. 11.

At 1610, the method may include receiving control signaling indicating a set of beamforming configurations associated with a set of antenna panels at a UE based at least in part on the request for the indication of the beamforming capability at the UE. The operations of 1610 may be performed in accordance with examples as disclosed herein. In some examples, aspects of the operations of 1610 may be performed by a beamforming configuration manager 1125 as described with reference to FIG. 11.

At 1615, the method may include receiving wireless communication according to a generated set of beam weights, the generated set of beam weights based at least in part on a beamforming configuration of the set of beamforming configurations and associated with at least one antenna panel of the set of antenna panels. The operations of 1615 may be performed in accordance with examples as disclosed herein. In some examples, aspects of the operations of 1615 may be performed by a communication receiver 1130 as described with reference to FIG. 11.

The following provides an overview of aspects of the present disclosure:

Aspect 1: A method for wireless communications at a UE, comprising: transmitting control signaling indicating a set of beamforming configurations associated with a set of antenna panels at the UE; selecting one or more antenna elements of at least one antenna panel of the set of antenna panels for wireless communication based at least in part on a beamforming configuration of the set of beamforming configurations and associated with the at least one antenna panel; generating a set of beam weights for the wireless communication based at least in part on the beamforming configuration and the one or more selected antenna elements of the at least one antenna panel; and transmitting the wireless communication using the generated set of beam weights.

Aspect 2: The method of aspect 1, further comprising: determining a set of beamforming properties associated with the set of beamforming configurations, the control signaling further indicating the set of beamforming properties associated with the set of beamforming configurations, wherein selecting the one or more antenna elements of the at least one antenna panel of the set of antenna panels for the wireless communication is further based at least in part on the set of beamforming properties.

Aspect 3: The method of any of aspects 1 through 2, wherein a first beamforming configuration associated with a first antenna panel of the set of antenna panels is different than a second beamforming configuration associated with a second antenna panel of the set of antenna panels.

Aspect 4: The method of any of aspects 1 through 3, wherein a first beamforming property associated with a first subset of antenna elements of the at least one antenna panel is different than a second beamforming property associated with a second subset of antenna elements of the at least one antenna panel.

Aspect 5: The method of any of aspects 1 through 4, further comprising: determining a threshold number of the set of beam weights associated with each beamforming configuration of the set of beamforming configurations, the control signaling further indicating the threshold number of the set of beam weights associated with each beamforming configuration of the set of beamforming configurations, wherein selecting the one or more antenna elements of the at least one antenna panel of the set of antenna panels for the wireless communication is further based at least in part on the threshold number of the set of beam weights.

Aspect 6: The method of any of aspects 1 through 5, further comprising: determining a number of beam weights associated with each beamforming configuration of the set of beamforming configurations, the control signaling further indicating the number of beam weights associated with each beamforming configuration of the set of beamforming configurations, wherein selecting the one or more antenna elements of the at least one antenna panel of the set of antenna panels for the wireless communication is further based at least in part on the number of beam weights.

Aspect 7: The method of any of aspects 1 through 6, further comprising: receiving second control signaling indicating the beamforming configuration, wherein selecting the one or more antenna elements of the at least one antenna panel of the set of antenna panels for the wireless communication is further based at least in part on the received second control signaling.

Aspect 8: The method of any of aspects 1 through 7, further comprising: determining a resource differential associated with each beamforming configuration of the set of beamforming configurations, the control signaling indicating the resource differential associated with each beamforming configuration of the set of beamforming configurations, wherein selecting the one or more antenna elements of the at least one antenna panel of the set of antenna panels for the wireless communication is further based at least in part on the resource differential.

Aspect 9: The method of aspect 8, wherein the resource differential comprises one or both of a power differential associated with each beamforming configuration of the set of beamforming configurations or a thermal overhead differential associated with each beamforming configuration of the set of beamforming configurations.

Aspect 10: The method of any of aspects 1 through 9, further comprising: receiving a request for an indication of a beamforming capability at the UE, wherein transmitting the control signaling indicating the set of beamforming configurations associated with the set of antenna panels at the UE is further based at least in part on the request for the indication of the beamforming capability at the UE.

Aspect 11: The method of any of aspects 1 through 10, wherein the set of beamforming configurations comprises one or both of a Butler matrix beamforming architecture or a vector sum modulator beamforming architecture or a lens array architecture.

Aspect 12: A method for wireless communications at a base station, comprising: receiving control signaling indicating a set of beamforming configurations associated with a set of antenna panels at a UE; and receiving wireless communication according to a generated set of beam weights, the generated set of beam weights based at least in part on a beamforming configuration of the set of beamforming configurations and associated with at least one antenna panel of the set of antenna panels.

Aspect 13: The method of aspect 12, wherein the control signaling further indicates a set of beamforming properties associated with the set of beamforming configurations.

Aspect 14: The method of any of aspects 12 through 13, wherein the control signaling further indicates a threshold number of the set of beam weights associated with each beamforming configuration of the set of beamforming configurations.

Aspect 15: The method of any of aspects 12 through 14, wherein the control signaling further indicates a number of beam weights associated with each beamforming configuration of the set of beamforming configurations.

Aspect 16: The method of any of aspects 12 through 15, further comprising: transmitting second control signaling indicating the beamforming configuration, wherein receiving the wireless communication according to the generated set of beam weights is based at least in part on transmitting the second control signaling.

Aspect 17: The method of any of aspects 12 through 16, wherein the control signaling further indicates a resource differential associated with each beamforming configuration of the set of beamforming configurations.

Aspect 18: The method of aspect 17, wherein the resource differential comprises one or both of a power differential associated with each beamforming configuration of the set of beamforming configurations or a thermal overhead differential associated with each beamforming configuration of the set of beamforming configurations.

Aspect 19: The method of any of aspects 12 through 18, further comprising: transmitting a request for an indication of a beamforming capability at the UE, wherein receiving the control signaling indicating the set of beamforming configurations associated with the set of antenna panels at the UE is further based at least in part on the request for the indication of the beamforming capability at the UE.

Aspect 20: The method of any of aspects 12 through 19, wherein the set of beamforming configurations comprises one or both of a Butler matrix beamforming architecture or a vector sum modulator beamforming architecture or a lens array architecture.

Aspect 21: An apparatus for wireless communications at a UE, comprising a processor; a memory coupled with the processor, wherein the memory comprises instructions executable by the processor to cause the apparatus to perform a method of any of aspects 1 through 11.

Aspect 22: An apparatus for wireless communications at a UE, comprising at least one means for performing a method of any of aspects 1 through 11.

Aspect 23: A non-transitory computer-readable medium storing code for wireless communications at a UE, the code comprising instructions executable by a processor to perform a method of any of aspects 1 through 11.

Aspect 24: An apparatus for wireless communications at a base station, comprising a processor; a memory coupled with the processor, wherein the memory comprises instructions executable by the processor to cause the apparatus to perform a method of any of aspects 12 through 20.

Aspect 25: An apparatus for wireless communications at a base station, comprising at least one means for performing a method of any of aspects 12 through 20.

Aspect 26: A non-transitory computer-readable medium storing code for wireless communications at a base station, the code comprising instructions executable by a processor to perform a method of any of aspects 12 through 20.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
    determining a threshold number of a set of beam weights associated with each beamforming configuration of a set of beamforming configurations;
    transmitting control signaling indicating the set of beamforming configurations associated with a set of antenna panels at the UE and indicating the threshold number of the set of beam weights associated with each beamforming configuration of the set of beamforming configurations;
    determining a beamforming property for wireless communication;
    selecting a beamforming configuration of the set of beamforming configurations based at least in part on the beamforming property for the wireless communication and based at least in part on the threshold number of the set of beam weights, wherein the beamforming configuration is associated with the set of beam weights;
    selecting one or more antenna elements of at least one antenna panel of the set of antenna panels for the wireless communication based at least in part on the selected beamforming configuration associated with the at least one antenna panel, wherein the one or more selected antenna elements of the at least one antenna panel support the beamforming property for the wireless communication;
    generating the set of beam weights for the wireless communication based at least in part on the beamforming configuration and the one or more selected antenna elements of the at least one antenna panel; and
    transmitting the wireless communication using the generated set of beam weights.

2. The method of claim 1, further comprising:
    determining a set of beamforming properties associated with the set of beamforming configurations, the control signaling further indicating the set of beamforming properties associated with the set of beamforming configurations, wherein selecting the one or more antenna elements of the at least one antenna panel of the set of antenna panels for the wireless communication is further based at least in part on the set of beamforming properties.

3. The method of claim 1, wherein a first beamforming configuration associated with a first antenna panel of the set of antenna panels is different than a second beamforming configuration associated with a second antenna panel of the set of antenna panels.

4. The method of claim 1, wherein a first beamforming property associated with a first subset of antenna elements of the at least one antenna panel is different than a second beamforming property associated with a second subset of antenna elements of the at least one antenna panel.

5. The method of claim 1, further comprising:
    determining a number of beam weights associated with each beamforming configuration of the set of beamforming configurations, the control signaling further indicating the number of beam weights associated with each beamforming configuration of the set of beamforming configurations, wherein selecting the one or more antenna elements of the at least one antenna panel of the set of antenna panels for the wireless communication is further based at least in part on the number of beam weights.

6. The method of claim 1, further comprising:
receiving second control signaling indicating the beamforming configuration, wherein selecting the one or more antenna elements of the at least one antenna panel of the set of antenna panels for the wireless communication is further based at least in part on the received second control signaling.

7. The method of claim 1, further comprising:
determining a resource differential associated with each beamforming configuration of the set of beamforming configurations, the control signaling indicating the resource differential associated with each beamforming configuration of the set of beamforming configurations, wherein selecting the one or more antenna elements of the at least one antenna panel of the set of antenna panels for the wireless communication is further based at least in part on the resource differential.

8. The method of claim 7, wherein the resource differential comprises one or both of a power differential associated with each beamforming configuration of the set of beamforming configurations or a thermal overhead differential associated with each beamforming configuration of the set of beamforming configurations.

9. The method of claim 1, further comprising:
receiving a request for an indication of a beamforming capability at the UE, wherein transmitting the control signaling indicating the set of beamforming configurations associated with the set of antenna panels at the UE is further based at least in part on the request for the indication of the beamforming capability at the UE.

10. The method of claim 1, wherein the set of beamforming configurations comprises a Butler matrix beamforming architecture, a vector sum modulator beamforming architecture, or a lens array architecture, or a combination thereof.

11. A method for wireless communications at a network entity, comprising:
receiving control signaling indicating a set of beamforming configurations associated with a set of antenna panels at a user equipment (UE) and indicating a threshold number of a generated set of beam weights associated with each beamforming configuration of the set of beamforming configurations; and
receiving wireless communication according to the generated set of beam weights, wherein the generated set of beam weights is based at least in part on a beamforming configuration of the set of beamforming configurations that supports a beamforming property for the wireless communication and is associated with the generated set of beam weights, wherein the generated set of beam weights is associated with at least one antenna panel of the set of antenna panels, wherein one or more selected antenna elements of the at least one antenna panel support the beamforming property for the wireless communication.

12. The method of claim 11, wherein the control signaling further indicates a set of beamforming properties associated with the set of beamforming configurations.

13. The method of claim 11, wherein the control signaling further indicates a number of beam weights associated with each beamforming configuration of the set of beamforming configurations.

14. The method of claim 11, further comprising:
transmitting second control signaling indicating the beamforming configuration, wherein receiving the wireless communication according to the generated set of beam weights is based at least in part on transmitting the second control signaling.

15. The method of claim 11, wherein the control signaling further indicates a resource differential associated with each beamforming configuration of the set of beamforming configurations.

16. The method of claim 15, wherein the resource differential comprises one or both of a power differential associated with each beamforming configuration of the set of beamforming configurations or a thermal overhead differential associated with each beamforming configuration of the set of beamforming configurations.

17. The method of claim 11, further comprising:
transmitting a request for an indication of a beamforming capability at the UE, wherein receiving the control signaling indicating the set of beamforming configurations associated with the set of antenna panels at the UE is further based at least in part on the request for the indication of the beamforming capability at the UE.

18. The method of claim 11, wherein the set of beamforming configurations comprises a Butler matrix beamforming architecture, a vector sum modulator beamforming architecture, or a lens array architecture, or a combination thereof.

19. An apparatus for wireless communications at a user equipment (UE), comprising:
one or more memories storing processor-executable code; and
one or more processors coupled with the one or more memories and individually or collectively operable to execute the code to cause the apparatus to:
determine a threshold number of a set of beam weights associated with each beamforming configuration of a set of beamforming configurations;
transmit control signaling indicating the set of beamforming configurations associated with a set of antenna panels at the UE and indicating the threshold number of the set of beam weights associated with each beamforming configuration of the set of beamforming configurations;
determine a beamforming property for wireless communication;
select a beamforming configuration of the set of beamforming configurations based at least in part on the beamforming property for the wireless communication and based at least in part on the threshold number of the set of beam weights, wherein the beamforming configuration is associated with the set of beam weights;
select one or more antenna elements of at least one antenna panel of the set of antenna panels for the wireless communication based at least in part on the selected beamforming configuration associated with the at least one antenna panel, wherein the one or more selected antenna elements of the at least one antenna panel support the beamforming property for the wireless communication;
generate the set of beam weights for the wireless communication based at least in part on the beamforming configuration and the one or more selected antenna elements of the at least one antenna panel; and transmit the wireless communication using the generated set of beam weights.

20. The apparatus of claim 19, wherein the one or more processors are individually or collectively further operable to execute the code to cause the apparatus to:
determine a set of beamforming properties associated with the set of beamforming configurations, the control signaling further indicating the set of beamforming properties associated with the set of beamforming configurations, wherein selecting the one or more antenna elements of the at least one antenna panel of the set of antenna panels for the wireless communication is further based at least in part on the set of beamforming properties.

21. The apparatus of claim 19, wherein a first beamforming configuration associated with a first antenna panel of the set of antenna panels is different than a second beamforming configuration associated with a second antenna panel of the set of antenna panels.

22. The apparatus of claim 19, wherein a first beamforming property associated with a first subset of antenna elements of the at least one antenna panel is different than a second beamforming property associated with a second subset of antenna elements of the at least one antenna panel.

23. The apparatus of claim 19, wherein the one or more processors are individually or collectively further operable to execute the code to cause the apparatus to:
determine a number of beam weights associated with each beamforming configuration of the set of beamforming configurations, the control signaling further indicating the number of beam weights associated with each beamforming configuration of the set of beamforming configurations, wherein the one or more antenna elements of the at least one antenna panel of the set of antenna panels for the wireless communication are selected further based at least in part on the number of beam weights.

24. The apparatus of claim 19, wherein the one or more processors are individually or collectively further operable to execute the code to cause the apparatus to:
receive second control signaling indicating the beamforming configuration, wherein the one or more antenna elements of the at least one antenna panel of the set of antenna panels for the wireless communication are selected further based at least in part on the received second control signaling.

25. The apparatus of claim 19, wherein the one or more processors are individually or collectively further operable to execute the code to cause the apparatus to:
receive a request for an indication of a beamforming capability at the UE, wherein the control signaling indicating the set of beamforming configurations associated with the set of antenna panels at the UE is transmitted further based at least in part on the request for the indication of the beamforming capability at the UE.

26. An apparatus for wireless communications at a network entity, comprising:
one or more memories storing processor-executable code; and
one or more processors coupled with the one or more memories and individually or collectively operable to execute the code to cause the apparatus to:
receive control signaling indicating a set of beamforming configurations associated with a set of antenna panels at a user equipment (UE) and indicating a threshold number of a generated set of beam weights associated with each beamforming configuration of the set of beamforming configurations; and
receive wireless communication according to the generated set of beam weights, wherein the generated set of beam weights is based at least in part on a beamforming configuration of the set of beamforming configurations that supports a beamforming property for the wireless communication and is associated with the generated set of beam weights, wherein the generated set of beam weights is associated with at least one antenna panel of the set of antenna panels, wherein one or more selected antenna elements of the at least one antenna panel support the beamforming property for the wireless communication.

27. The apparatus of claim 26, wherein the control signaling further indicates a set of beamforming properties associated with the set of beamforming configurations.

* * * * *